United States Patent
Arimoto

(10) Patent No.: US 9,341,825 B2
(45) Date of Patent: May 17, 2016

(54) ZOOM LENS AND PHOTOGRAPHING APPARATUS INCLUDING THE SAME

(71) Applicant: SAMSUNG ELECTRONICS CO., LTD., Suwon-si, Gyeonggi-do (KR)

(72) Inventor: Tetsuya Arimoto, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 13/752,799

(22) Filed: Jan. 29, 2013

(65) Prior Publication Data

US 2013/0235465 A1    Sep. 12, 2013

(30) Foreign Application Priority Data

Mar. 9, 2012 (KR) .................. 10-2012-0024545

(51) Int. Cl.
- *G02B 15/14* (2006.01)
- *G02B 13/04* (2006.01)
- *G02B 13/06* (2006.01)
- *G02B 15/177* (2006.01)

(52) U.S. Cl.
CPC ............... *G02B 13/04* (2013.01); *G02B 13/06* (2013.01); *G02B 15/177* (2013.01)

(58) Field of Classification Search
CPC ........ G02B 15/00; G02B 15/02; G02B 15/04; G02B 15/16; G02B 15/163; G02B 15/167; G02B 15/177; G02B 15/20; G02B 15/22
See application file for complete search history.

(56) References Cited

U.S. PATENT DOCUMENTS

| | | | |
|---|---|---|---|
| 5,774,267 A * | 6/1998 | Kodama et al. | 359/557 |
| 6,606,201 B1 | 8/2003 | Hirose | |
| 6,850,373 B2 * | 2/2005 | Mihara et al. | 359/676 |
| 7,256,946 B2 | 8/2007 | Yoneyama | |
| 7,511,892 B2 | 3/2009 | Takato | |
| 7,773,308 B2 | 8/2010 | Muramatsu et al. | |

(Continued)

FOREIGN PATENT DOCUMENTS

| | | |
|---|---|---|
| CN | 101533150 A | 9/2009 |
| CN | 1949018 B | 5/2010 |

(Continued)

OTHER PUBLICATIONS

Search Report established for PCT/KR2013/001888 (Jun. 24, 2013).

(Continued)

*Primary Examiner* — Ricky Mack
*Assistant Examiner* — Robert E Tallman
(74) *Attorney, Agent, or Firm* — Drinker Biddle & Reath LLP

(57) ABSTRACT

A zoom lens and a photographing apparatus including the same. The zoom lens includes, in an order from an object side: a first lens group having negative refractive power; a second lens group having positive refractive power; a third lens group having positive refractive power; and a fourth lens group having an iris on a side of the fourth lens group closest to the object side and positive refractive power, wherein, while zooming from a wide angle position to a telephoto position, the first through fourth lens groups are moved such that the interval between the first and second lens groups increases, the interval between the second and third lens groups decreases, and the interval between the third and fourth lens groups decreases, and focusing is performed by moving the third lens group.

16 Claims, 21 Drawing Sheets

(56) References Cited

U.S. PATENT DOCUMENTS

| | | |
|---|---|---|
| 7,817,349 B2 | 10/2010 | Kawamura |
| 7,961,409 B2 | 6/2011 | Yamamoto et al. |
| 8,144,403 B2 | 3/2012 | Ito et al. |
| 8,154,648 B2 | 4/2012 | Morooka |
| 2002/0015235 A1 | 2/2002 | Hirose |
| 2007/0035851 A1 | 2/2007 | Liao |
| 2010/0271601 A1* | 10/2010 | Amano ............... G02B 15/177 353/97 |
| 2011/0013151 A1* | 1/2011 | Nagahara ..................... 353/101 |
| 2011/0157719 A1 | 6/2011 | Yoneyama |
| 2011/0267704 A1 | 11/2011 | Sado |
| 2013/0088786 A1* | 4/2013 | Sugita ................. G02B 15/173 359/684 |

FOREIGN PATENT DOCUMENTS

| | | |
|---|---|---|
| JP | 2004-258511 A | 9/2004 |
| JP | 2007-047783 A | 2/2007 |
| JP | 2009-014761 A | 1/2009 |
| JP | 2009-014766 A | 1/2009 |
| JP | 2009-175603 A | 8/2009 |
| JP | 2010-044264 A | 2/2010 |
| JP | 2010-145696 A | 7/2010 |
| KR | 10-2011-0074291 A | 6/2011 |

OTHER PUBLICATIONS

Search Report established for EP 13155837.1 (Jun. 28, 2013).
Office Action issued in related application CN 201310072579.8 with English language translation, Mar. 14, 2016, 19 pages.

* cited by examiner

ZOOM LENS AND PHOTOGRAPHING APPARATUS INCLUDING THE SAME

CROSS-REFERENCE TO RELATED PATENT APPLICATION

This application claims the benefit of Korean Patent Application No. 10-2012-0024545, filed on Mar. 9, 2012, in the Korean Intellectual Property Office, the disclosure of which is incorporated herein in its entirety by reference.

BACKGROUND

Embodiments relate to a zoom lens capable of quick focusing by using a lightweight focusing lens group, and a photographing apparatus including the zoom lens.

In an optical system using a solid state image pickup device, such as a charged coupled device (CCD) digital camera, an interchangeable lens, or a video camera, users demand not only high resolution, but also a wide angle and high magnification. Also, the number of professional camera users is continuously increasing. According to such market demands, a lens interchangeable camera should use a super wide angle zoom lens having a view angle above 90° in order to capture a high quality photograph via auto focusing. However, if a focusing lens group is heavy, auto focusing may be slowed down. Alternatively, if a focusing lens group is light, aberration correction of an astigmatic field curvature may be difficult. Accordingly, it is required to satisfactorily perform aberration correction while making a focusing lens group lightweight.

SUMMARY

An embodiment provides a zoom lens capable of quick focusing.

An embodiment also provides a photographing apparatus including a zoom lens capable of quick focusing.

According to an embodiment, there is provided a zoom lens including, in an order from an object side: a first lens group having negative refractive power; a second lens group having positive refractive power; a third lens group having positive refractive power; and a fourth lens group having an iris on a side of the fourth lens group closest to the object side and positive refractive power, wherein, while zooming from a wide angle position to a telephoto position, the first through fourth lens groups are moved such that the interval between the first and second lens groups increases, the interval between the second and third lens groups decreases, and the interval between the third and fourth lens groups decreases, and focusing is performed by moving the third lens group.

The zoom lens may satisfy the following equation:

$$1.1 < TL/TW < 1.6,$$

wherein TW denotes the interval between the first and second lens groups at the wide angle position and TL denotes the interval between the first and second lens groups at the telephoto position.

The third lens group may include a positive lens and a negative lens.

The positive lens and the negative lens may be a cemented lens and satisfy the following equation:

$$2.3 < |f3/\sqrt{(fw \times ft)}| < 3.4,$$

wherein f3 denotes the focal length of the third lens group, fw denotes the overall focal length of the zoom lens at the wide angle position, and ft denotes the overall focal length of the zoom lens at the telephoto position.

The first lens group may include at least two negative lenses, which may include at least one aspherical surface.

The fourth lens group may include a first sub lens group having positive refractive power and a second sub lens group having positive refractive power.

The first sub lens group may include one positive lens.

The first sub lens group may include a cemented lens including a positive lens and a negative lens.

The first sub lens group may satisfy the following equation:

$$0.4 < fP/f4 < 1.3,$$

wherein fP denotes the focal length of the first sub lens group of the fourth lens group and f4 denotes the focal length of the fourth lens group.

The second sub lens group may include a cemented lens including a negative lens and a positive lens, and satisfies the following equation:

$$0.2 < r/L4 < 0.7,$$

wherein r denotes the radius of curvature of the cemented surface of the cemented lens of the second sub lens group, and L4 denotes the full length of the fourth lens group.

The second sub lens group may include a cemented lens including a negative lens and a positive lens, and satisfies the following equation:

$$n1 - n2 > 0.25,$$

wherein n1 denotes the refractive index of the negative lens of the cemented lens of the second sub lens group and n2 denotes the refractive index of the positive lens of the cemented lens of the second sub lens group.

The fourth lens group may include at least one aspherical surface.

According to another embodiment, there is provided a photographing apparatus including: a zoom lens; and an imaging device for receiving an image formed by the zoom lens, wherein the zoom lens may include, in an order from an object side: a first lens group having negative refractive power; a second lens group having positive refractive power; a third lens group having positive refractive power; and a fourth lens group having an iris on a side of the fourth lens group closest to the object side and positive refractive power, wherein, while zooming from a wide angle position to a telephoto position, the first through fourth lens groups are moved such that the interval between the first and second lens groups increases, the interval between the second and third lens groups decreases, and the interval between the third and fourth lens groups decreases, and focusing is performed by moving the third lens group.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
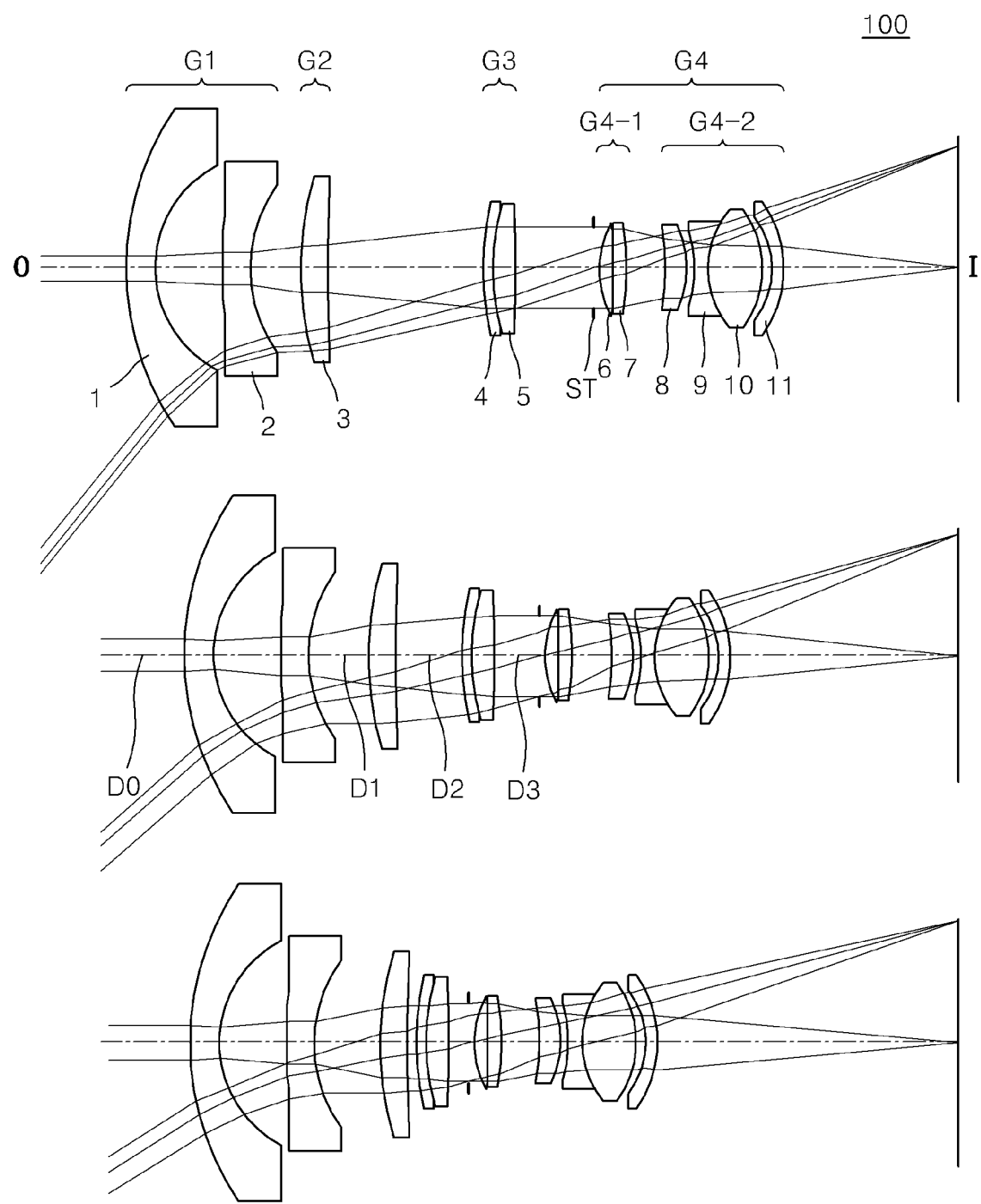
FIG. 1 is a diagram of an embodiment of a zoom lens at a wide angle position, a middle position, and a telephoto position.

Hereinafter, various embodiments will be described more fully with reference to the accompanying drawings. The invention may, however, be embodied in many different forms and should not be construed as being limited to the embodiments set forth herein. In the drawings, like reference numerals denote like elements, and sizes and thicknesses of layers and regions may be exaggerated for clarity.

FIG. 1 is a diagram of a zoom lens 100 according to an embodiment. The zoom lens 100 may include, in an order from an object side O, a first lens group G1 having negative refractive power, a second lens group G2 having positive refractive power, a third lens group G3 having positive refractive power, and a fourth lens group G4 having positive refractive power. The fourth lens group G4 may include an iris (or aperture stop) ST on a side of the fourth lens group G4 closest to the object side O.

While zooming from a wide angle position to a telephoto position, the interval between the first and second lens groups G1 and G2 increases, the interval between the second and third lens groups G2 and G3 decreases, and the interval between the third and fourth lens groups G3 and G4 decreases. While zooming from the wide angle position to the telephoto position, the first through fourth lens groups G1 through G4 may individually move. While zooming from the wide angle position to the telephoto position, the interval between the first and second lens groups G1 and G2 increases so that a difference between heights of principal rays passing through the first and second lens groups G1 and G2, which are lower at the telephoto position, may be suitably controlled. Accordingly, an astigmatic field curvature fluctuation and other aberration fluctuations due to zooming in a wide angle zoom lens may be reduced.

Meanwhile, the third lens group G3 may move toward an image side I so as to perform focusing from an infinite distance to a near distance.

The first lens group G1 may include at least two negative lenses. For example, the first lens group G1 may include a first lens 1 having negative refractive power and a second lens 2 having negative refractive power. The first lens group G1 may include at least one aspherical surface.

The second lens group G2 may include at least one positive lens. For example, the second lens group G2 may include a third lens 3 having positive refractive power.

The third lens group G3 may include, for example, a fourth lens 4 having negative refractive power and a fifth lens 5 having positive refractive power. The fourth and fifth lenses 4 and 5 may be a cemented lens. Here, lenses are disposed in an order of a negative lens and a positive lens, but alternatively, the lenses may be disposed in an order of a positive lens and a negative lens. As such, since the third lens group G3 includes a relatively low number of lenses, the weight of the third lens group G3 is relatively light. Thus, when the third lens group G3 is used as a focusing lens group, a focusing operation may be quickly performed.

Figure 3:
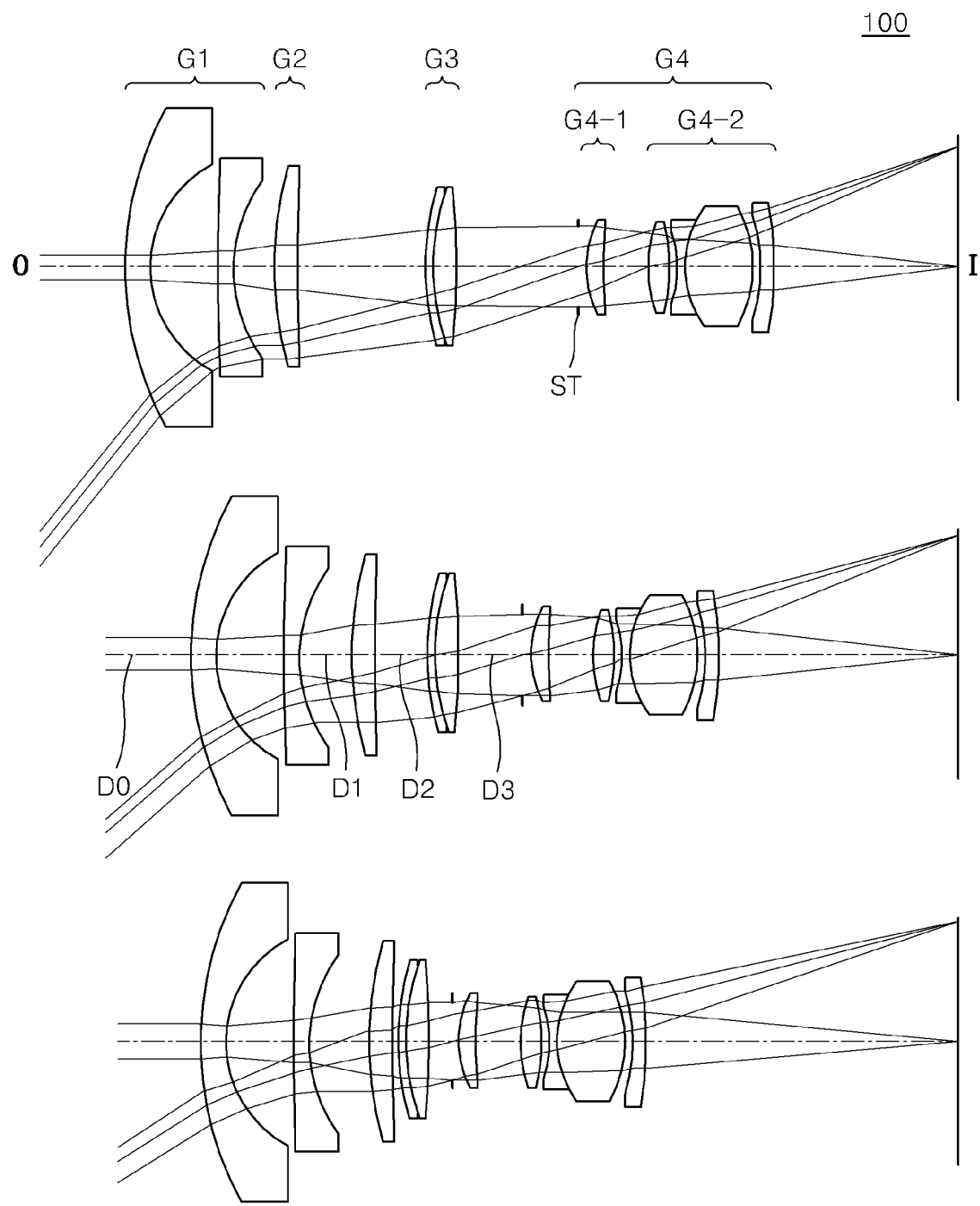
FIG. 3 is a diagram of another embodiment of a zoom lens at a wide angle position, a middle position, and a telephoto position.
Figure 5:
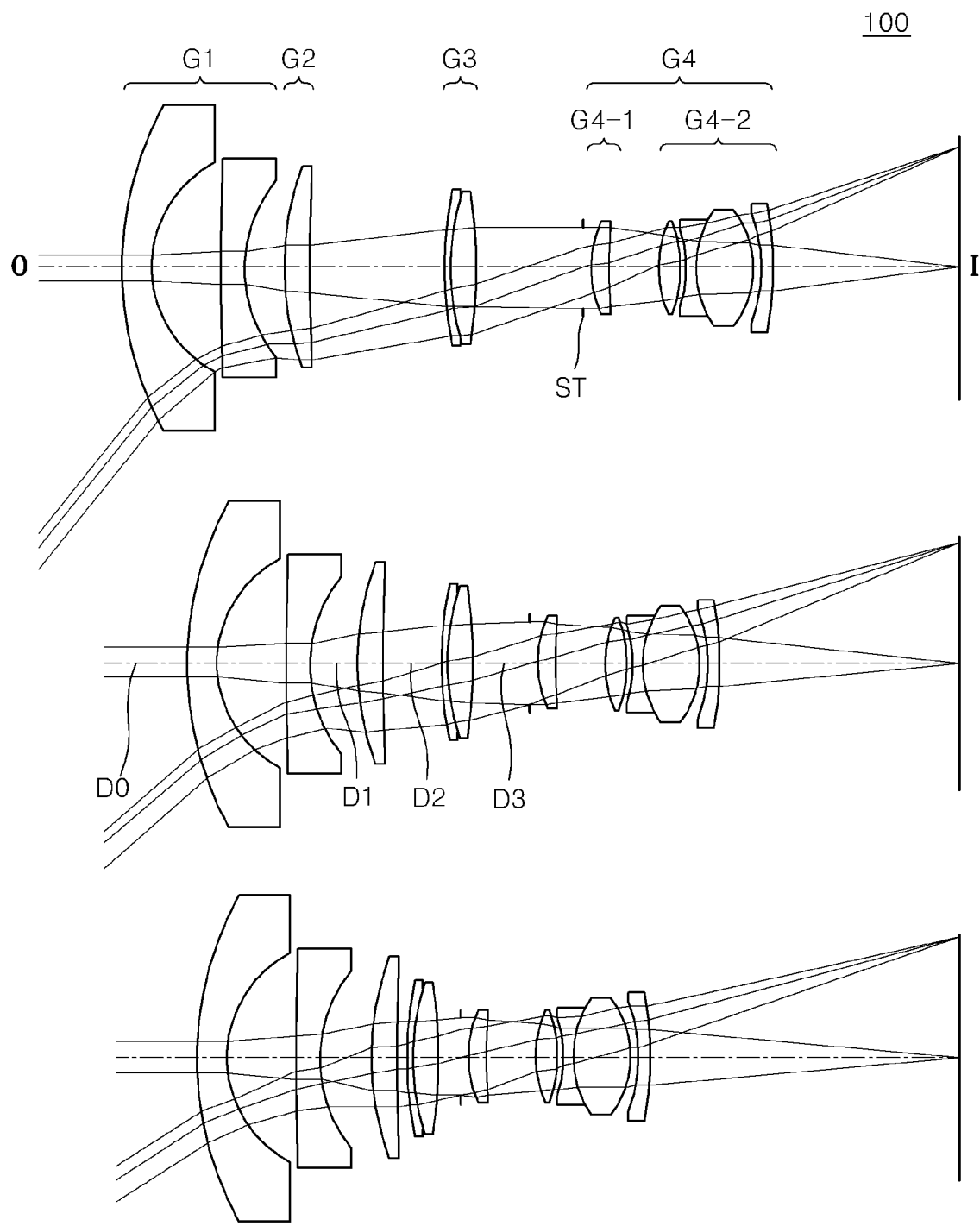
FIG. 5 is a diagram of another embodiment of a zoom lens at a wide angle position, a middle position, and a telephoto position.

The fourth lens group G4 may include a first sub lens group G4-1 having positive refractive power and a second sub lens group G4-2 having positive refractive power. The first sub lens group G4-1 may include at least one lens, for example, a sixth lens 6 having positive refractive power and a seventh lens 7 having negative refractive power. The sixth and seventh lenses 6 and 7 may form a cemented lens. Alternatively, as shown in FIGS. 3 and 5, the first sub lens group G4-1 may include one positive lens.

The second sub lens group G4-2 may include at least one cemented lens. For example, the second sub lens group G4-2 may include an eighth lens 8 having positive refractive power, a ninth lens 9 having negative refractive power, a tenth lens 10 having positive refractive power, and an eleventh lens 11 having negative refractive power. The ninth and tenth lenses 9 and 10 may form a cemented lens. The cemented lens formed of the ninth and tenth lenses 9 and 10 may have positive refractive power overall.

Meanwhile, the zoom lens 100 according to the current embodiment may satisfy Equation 1 below.

$$1.1 < TL/TW < 1.6 \qquad \text{<Equation 1>}$$

Here, TW denotes the interval between the first lens group G1 and the second lens group G2 at the wide angle position, and TL denotes the interval between the first lens group G1 and the second lens group G2 at the telephoto position. Equation 1 relates to the interval between the first and second lens groups G1 and G2 during zooming, and if TL/TW is lower than the lower value, the interval between the first and second lens groups G1 and G2 is decreased and a passing location of a principal ray at the telephoto position may not be suitably set, and thus an astigmatic field curvature at the telephoto position may be over-corrected. If TL/TW is higher than the upper value, aberration may be satisfactorily corrected but a full length of the zoom lens 100 at the telephoto position may be too high, and thus the first and second lens groups G1 and G2 may not obtain a suitable power relationship.

According to the zoom lens 100, the third lens group G3 performs focusing. The third lens group G3 may satisfy Equation 2 below.

$$2.3 < |f3/\sqrt{(fw \times ft)}| < 3.4 \qquad \text{<Equation 2>}$$

Here, f3 denotes the focal length of the third lens group G3, fw denotes the overall focal length of the zoom lens 100 at the wide angle position, and ft denotes the overall focal length of the zoom lens 100 at the telephoto position.

If $|f3/\sqrt{(fw \times ft)}|$ is lower than the lower value, the power of the third lens group G3 is increased, and thus spherical aberration and astigmatic field curvature fluctuations due to focusing are highly increased. If $|f3/\sqrt{(fw \times ft)}|$ is higher than the upper value, the power of the third lens group G3 is excessively decreased, and thus auto-focusing may not be quickly performed due to a relatively large movement required during focusing.

In the current embodiment, the first lens group G1 includes at least two negative lenses and at least one aspherical surface, and thus may correct distortion and astigmatic field curvature.

The fourth lens group G4 may include the iris ST on the side of the fourth lens group G4 closest to the object side O so as to prevent a location of an exit pupil from excessively approaching the image I.

Also, the first sub lens group G4-1 having positive refractive power is disposed after the iris ST, and the first sub lens group G4-1 satisfies Equation 3 below.

$$0.4 < fP/f4 < 1.3 \qquad \text{<Equation 3>}$$

Here, fP denotes the focal length of the first sub lens group G4-1 of the fourth lens group G4, and f4 denotes the focal length of the fourth lens group G4.

If fP/f4 is lower than the lower value, the power of the first sub lens group G4-1 is excessively increased, and thus spherical aberration may not be satisfactorily corrected. If fP/f4 is higher than the upper value, the power of the first sub lens group G4-1 may be excessively decreased, and the location of the exit pupil may excessively approach the image I, thereby causing a shading problem.

Also, the second sub lens group G4-2 of the fourth lens group G4 may include a cemented lens formed of a negative lens and a positive lens, and a cemented surface of the cemented lens may satisfy Equation 4 below.

$$0.2 < r/L4 < 0.7 \qquad \text{<Equation 4>}$$

Here, r denotes the radius of curvature of the cemented surface of the cemented lens included in the second sub lens group G4-2, and L4 denotes the full length of the fourth lens group G4.

Also, the second sub lens group G4-2 may satisfy Equation 5 below.

$$n1 - n2 > 0.25 \qquad \text{<Equation 5>}$$

Here, n1 denotes the refractive index of the negative lens of the cemented lens, and n2 denotes the refractive index of the positive lens of the cemented lens.

Equations 4 and 5 relate to higher order aberration control by the cemented lens of the second sub lens group G4-2, and if r/L4 is lower than the lower value, curvature of the cemented surface is excessively increased, and thus higher order aberration, such as spherical aberration or astigmatic field curvature, is often generated, and it is difficult to adjust an aberration balance. If r/L4 is higher than the upper value, the curvature of the cemented surface is decreased, and thus higher order aberration may not be suitably generated.

If n1−n2 does not satisfy Equation 5, the power of the cemented surface is excessively decreased, and thus it is difficult to obtain a degree of freedom for controlling higher order aberration.

Meanwhile, the fourth lens group G4 may include at least one aspherical surface. For example, when the aspherical surface is disposed relatively close to the object side O (Example 1), the aspherical surface may contribute to correction of spherical aberration or correction of comma aberration. Alternatively, when the aspherical surface is disposed relatively close to the image side I (Examples 2 through 5), the aspherical surface may contribute to correction of astigmatic field curvature or correction of distortion.

As described above, the zoom lens 100 according to the current embodiment has a wide angle, that is, a view angle at the wide angle position that is above 90°, is capable of quick auto focusing, and is compact, and thus realizes a high performance super wide angle zoom lens.

According to an embodiment, the aspherical surfaces used in the zoom lens 100 may be defined as follows.

Assuming that an optical axis direction of an aspherical shape is an x-axis, a direction perpendicular to the optical axis direction is a y-axis, and a proceeding direction of light is referred to as a positive direction, an aspherical surface used in the zoom lens 100 may satisfy Equation 8. Here, x denotes a distance from a vertex of a lens in the optical axis direction, y denotes a distance from the x-axis in a direction perpendicular to the optical axis direction, K denotes a conic constant, A, B, C, and D denote aspherical coefficients, and c denotes a reciprocal (1/R) of a radius of curvature at the vertex of the lens.

$$x = \frac{cy^2}{1 + \sqrt{1 - (K+1)c^2 y^2}} + Ay^4 + By^6 + Cy^8 + Dy^{10} \qquad \text{<Equation 8>}$$

A zoom lens is realized according to various designs through examples below. Hereinafter, f denotes an overall focal length in units of mm, fno denotes an F-number, 2ω denotes a view angle in units of degrees, R denotes a radius of curvature, Dn denotes a distance between lenses or a thickness of a lens, Nd denotes a refractive index, vd denotes an Abbe's number, and * denotes an aspherical surface. In each example, at least one filter (not shown) may be included on a side closest to the image side I.

Example 1

FIG. 1 is a diagram of the zoom lens 100 at a wide angle position, a middle position, and a telephoto position, according to Example 1, and Table 1 below shows design data. FIG. 1 illustrates reference numerals of lens surfaces of each lens, but reference numerals of lens surfaces are omitted in drawings of other examples.

TABLE 1 f: 12.36 to 17.00 to 23.28 fno: 4.1 to 4.73 to 5.8 2ω: 103° to 82° to 64°

| Lens Surface | R | Dn | Nd | vd |
|---|---|---|---|---|
| 1 | 33.480 | 3.500 | 1.77250 | 49.6 |
| 2 | 13.585 | 8.031 | | |
| 3 | 363.241 | 3.000 | 1.77250 | 49.6 |
| 4* | 14.785 | D1 | | |
| 5 | 41.413 | 3.000 | 1.84666 | 23.8 |
| 6 | 252.681 | D2 | | |
| 7 | 32.111 | 1.000 | 1.84666 | 23.8 |
| 8 | 21.588 | 3.000 | 1.54814 | 45.8 |
| 9 | −69.778 | D3 | | |
| 10 | INFINITY | 1.000 | | |
| 11 | 12.571 | 2.000 | 1.48749 | 70.4 |
| 12 | −20.081 | 1.000 | 1.77250 | 49.6 |
| 13 | −40.683 | 4.652 | | |
| 14* | −21.445 | 2.400 | 1.48749 | 70.2 |
| 15 | −10.823 | 0.800 | | |
| 16 | −18.759 | 1.697 | 1.79952 | 42.2 |
| 17 | 10.613 | 6.500 | 1.48749 | 70.4 |
| 18 | −11.579 | 1.000 | | |
| 19 | −10.012 | 1.500 | 1.77250 | 49.6 |
| 20 | −13.233 | | | |

Table 2 below shows aspherical coefficients in Example 1.

TABLE 2

| Lens Surface | Aspherical Coefficient |
|---|---|
| 4 | K: 0.0 A: −0.557723E−04 B: −0.116818E−06<br>C: −0.255655E−09 D: −0.278214E−11 |
| 14 | K: 0.0 A: −0.211457E−03 B: −0.316202E−06<br>C: −0.737882E−07 D: 0.263416E−08 |

Table 3 below shows a variable distance during zooming in Example 1.

TABLE 3

| D0 | INFINITY | INFINITY | INFINITY | 232.177 | 239.016 | 239.856 |
|---|---|---|---|---|---|---|
| D1 | 6.140 | 7.294 | 7.837 | 6.140 | 7.294 | 7.837 |
| D2 | 18.246 | 7.837 | 1.000 | 19.231 | 8.882 | 2.126 |
| D3 | 8.857 | 4.957 | 2.127 | 7.872 | 3.913 | 1.001 |

Figure 2A:
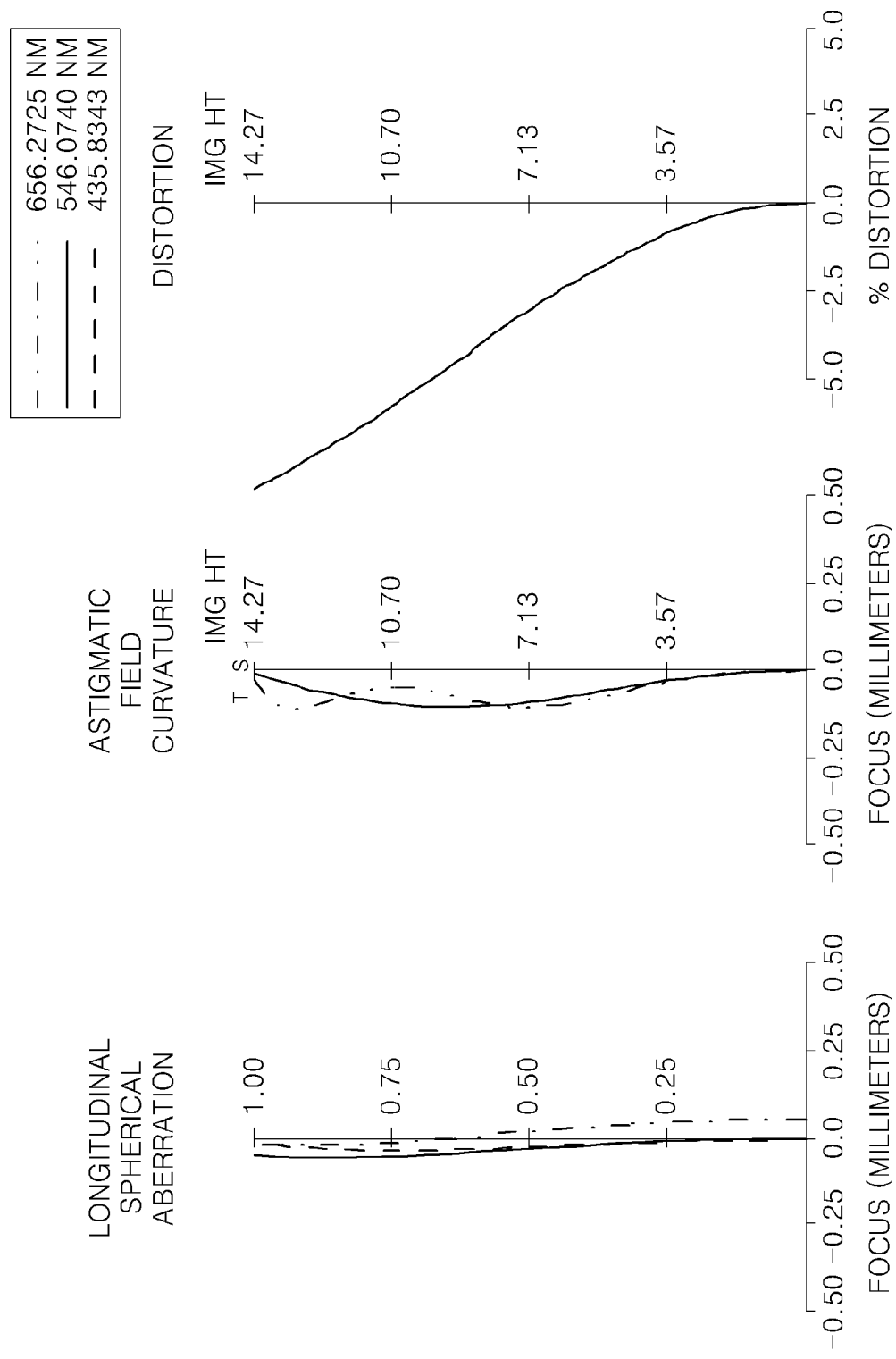
FIGS. 2A through 2C are aberration diagrams of the zoom lens of FIG. 1 at the wide angle position, the middle position, and the telephoto position.
Figure 2B:
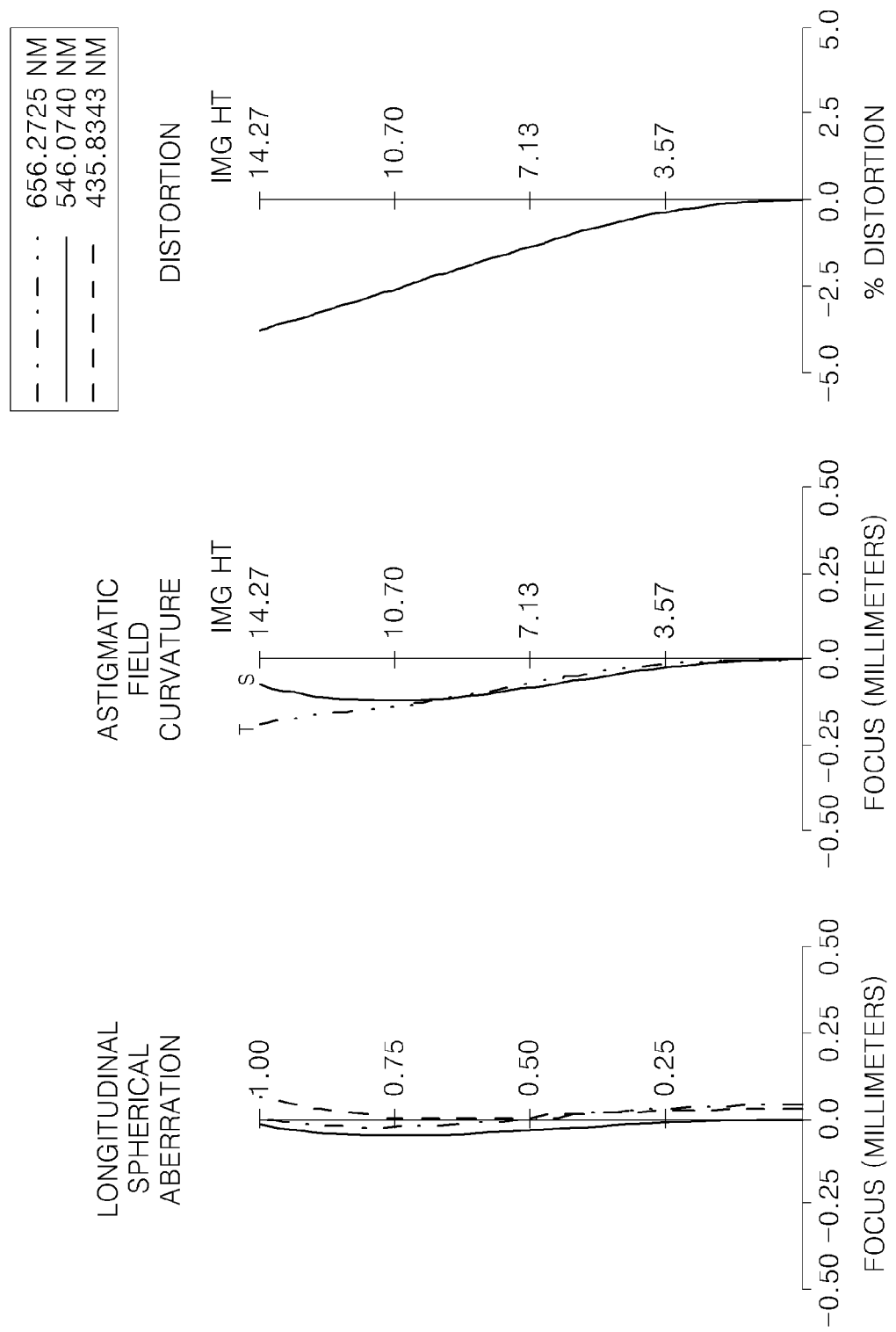
Figure 2C:
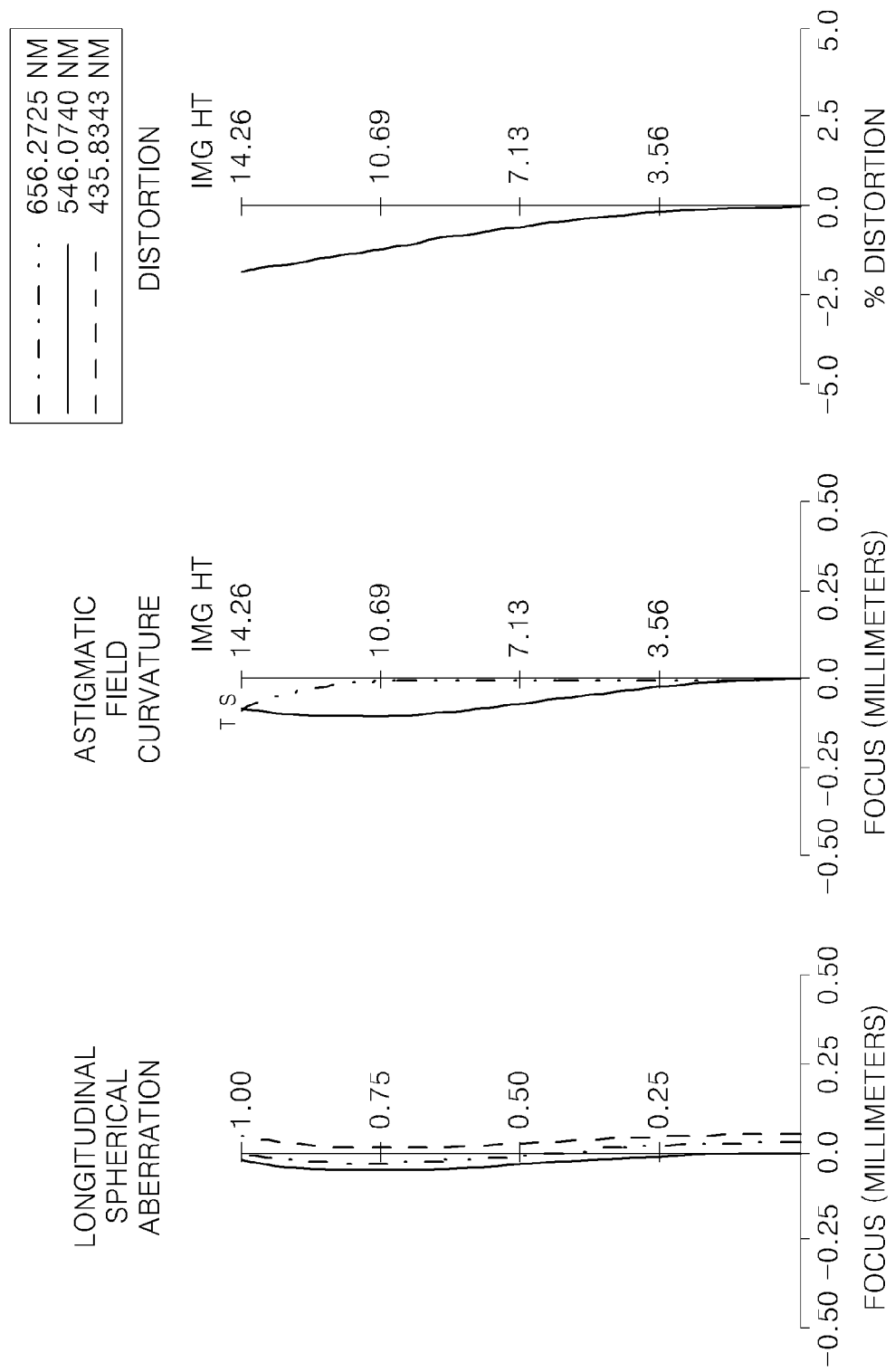

FIGS. 2A through 2C illustrate longitudinal spherical aberration, astigmatic field curvature, and distortion at each of the wide angle position, middle position, and the telephoto position of the zoom lens 100 of FIG. 1. Tangential field curvature T and sagittal field curvature S are shown as the astigmatic field curvature.

Example 2

FIG. 3 is a diagram of the zoom lens 100 according to Example 2, and Table 4 below shows design data.

TABLE 4 f: 12.36 to 17.00 to 23.40 fno: 4.1 to 4.73 to 5.8 2ω: 103° to 82° to 64°

| Lens Surface | R | Dn | Nd | vd |
|---|---|---|---|---|
| 1 | 38.412 | 3.000 | 1.77250 | 49.6 |
| 2 | 13.802 | 8.222 | | |
| 3* | 836.077 | 1.700 | 1.77250 | 49.6 |
| 4* | 14.967 | D1 | | |
| 5 | 40.557 | 3.000 | 1.84666 | 23.8 |
| 6 | 173.187 | D2 | | |
| 7 | 35.160 | 0.800 | 1.84666 | 23.8 |
| 8 | 26.500 | 3.000 | 1.54814 | 45.8 |
| 9 | −70.576 | D3 | | |
| 10 | INFINITY | 1.000 | | |
| 11 | 14.490 | 2.000 | 1.49700 | 81.6 |
| 12 | 73.143 | 5.335 | | |
| 13 | 17.625 | 2.400 | 1.48749 | 70.4 |
| 14 | −24.134 | 0.800 | | |
| 15 | −17.784 | 1.200 | 1.79952 | 42.2 |
| 16 | 12.221 | 7.945 | 1.48749 | 70.4 |
| 17 | −13.858 | 1.000 | | |
| 18 | −19.561 | 1.500 | 1.77250 | 49.6 |
| 19* | −32.460 | | | |

Table 5 shows aspherical coefficients in Example 2.

TABLE 5

| Lens Surface | Aspherical Coefficient |
|---|---|
| 3 | K: 0.0 A: 0.153307E−04 B: −0.125166E−06<br>C: 0.472337E−09 D: −0.129958E−11 |
| 4 | K: 0.0 A: −0.420204E−04 B: −0.202328E−06<br>C: −0.349806E−09 D: −0.214128E−11 |
| 19 | K: 0.0 A: 0.539287E−04 B: 0.172745E−06<br>C: 0.153889E−08 D: −0.140743E−10 |

Table 6 below shows a variable distance during zooming in Example 2.

TABLE 6

| D0 | INFINITY | INFINITY | INFINITY | 141.002 | 148.597 | 149.915 |
|---|---|---|---|---|---|---|
| D1 | 4.651 | 6.088 | 6.726 | 4.651 | 6.088 | 6.726 |
| D2 | 15.161 | 6.357 | 1.000 | 16.403 | 7.694 | 2.445 |
| D3 | 14.298 | 7.574 | 2.466 | 13.055 | 6.238 | 1.021 |

Figure 4A:
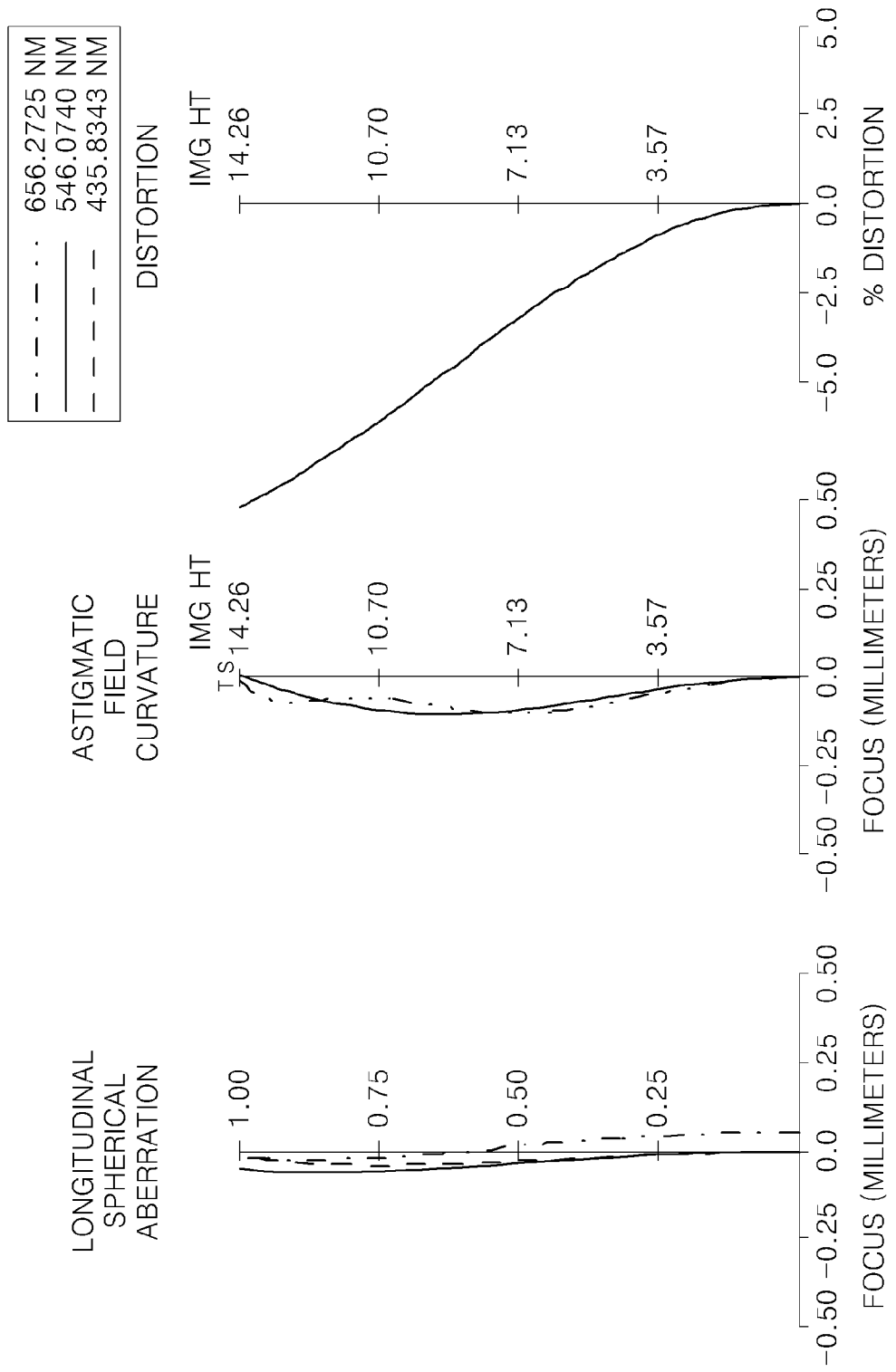
FIGS. 4A through 4C are aberration diagrams of the zoom lens of FIG. 3 at the wide angle position, the middle position, and the telephoto position.
Figure 4B:
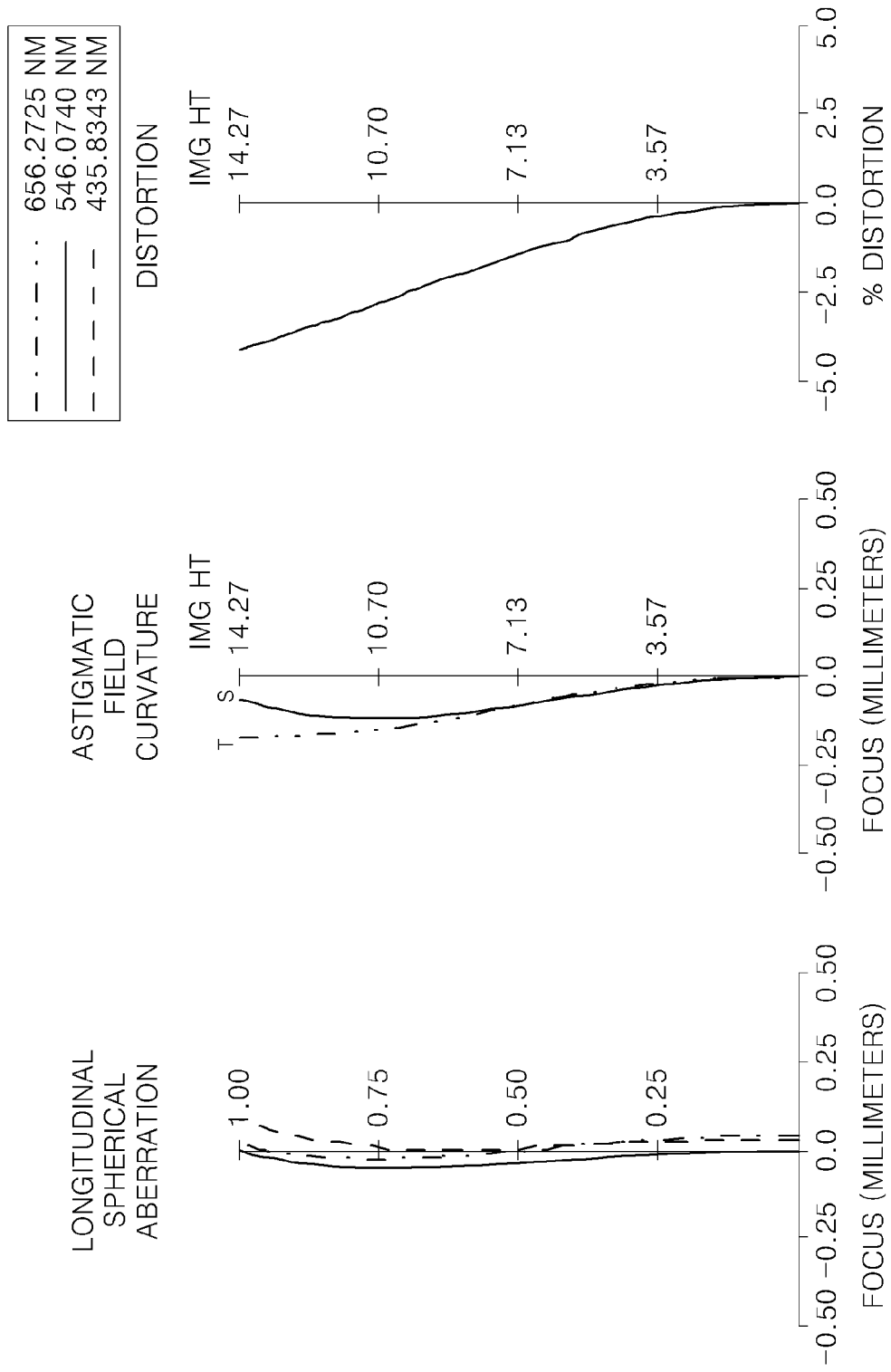
Figure 4C:
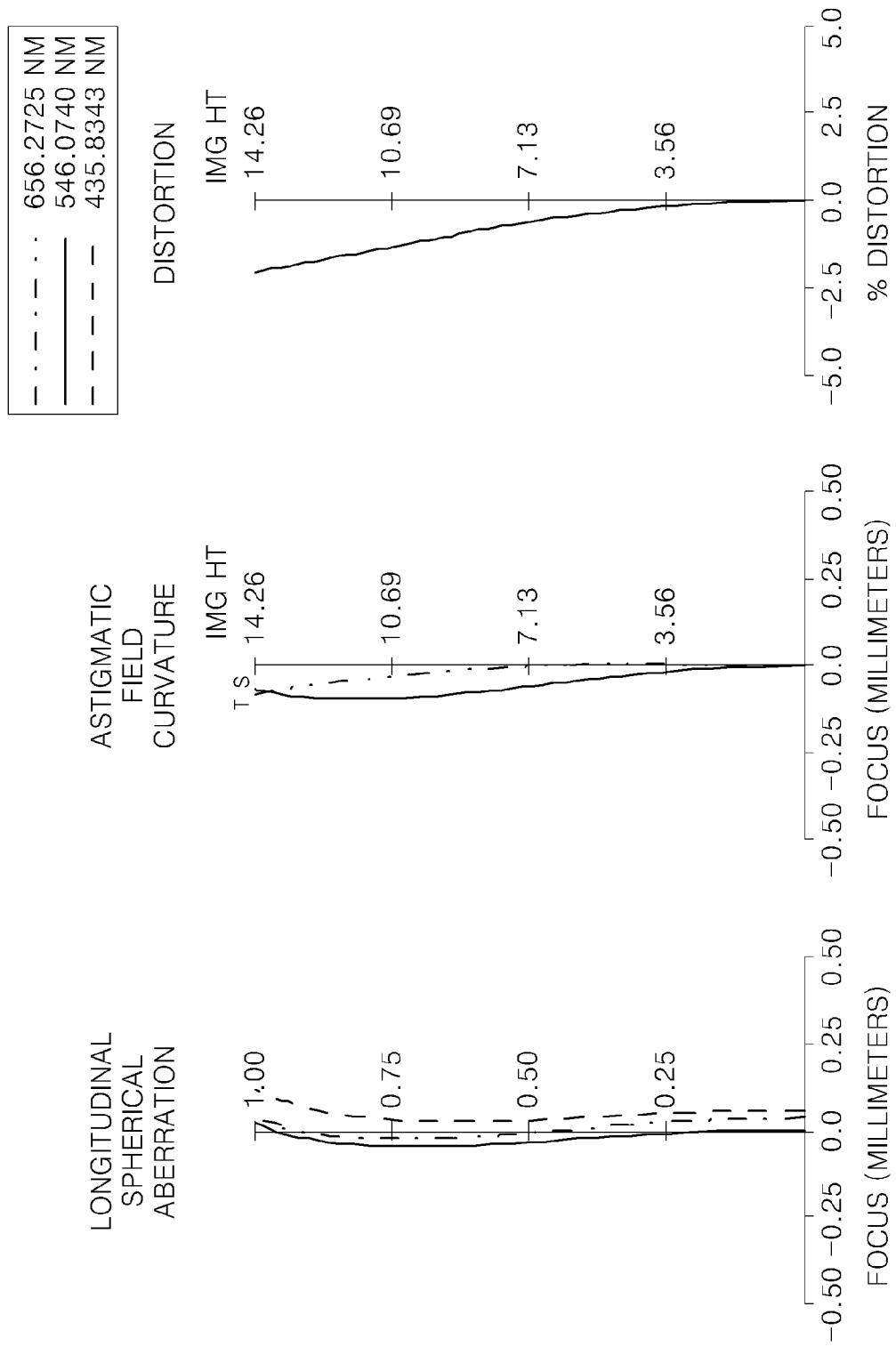

FIGS. 4A through 4C illustrate longitudinal spherical aberration, astigmatic field curvature, and distortion respectively at each of the wide angle position, middle position, and the telephoto position of the zoom lens 100 of FIG. 3.

Example 3

FIG. 5 is a diagram of the zoom lens 100 according to Example 3, and Table 7 below shows design data.

TABLE 7 f: 12.36 to 17.00 to 23.28 fno: 4.1 to 4.73 to 5.8 2ω: 103° to 82° to 64°

| Lens Surface | R | Dn | Nd | vd |
|---|---|---|---|---|
| 1 | 40.460 | 3.352 | 1.77250 | 49.6 |
| 2 | 13.816 | 8.191 | | |
| 3* | 881.987 | 2.964 | 1.80450 | 39.6 |
| 4* | 14.678 | D1 | | |
| 5 | 37.699 | 3.000 | 1.84666 | 23.8 |
| 6 | 654.674 | D2 | | |
| 7 | 39.542 | 0.800 | 1.84666 | 23.8 |
| 8 | 29.233 | 3.000 | 1.54814 | 45.8 |
| 9 | −64.786 | D3 | | |
| 10 | INFINITY | 1.000 | | |
| 11 | 13.938 | 2.000 | 1.49700 | 81.6 |
| 12 | 46.828 | 5.971 | | |
| 13 | 16.096 | 2.400 | 1.48749 | 70.4 |
| 14 | −21.177 | 0.800 | | |
| 15 | −15.876 | 1.200 | 1.79952 | 42.2 |
| 16 | 12.219 | 6.671 | 1.48749 | 70.4 |
| 17 | −12.135 | 1.000 | | |
| 18 | −16.671 | 1.500 | 1.77250 | 49.6 |
| 19* | −29.185 | | | |

Table 8 below shows aspherical coefficients in Example 3.

TABLE 8

| Lens Surface | Aspherical Coefficient |
|---|---|
| 3 | K: 0.0 A: 0.247810E−04 B: −0.266040E−06<br>C: 0.143137E−08 D: −0.359785E−11 |
| 4 | K: 0.0 A: −0.327993E−04 B: −0.489322E−06<br>C: 0.198776E−08 D: −0.974853E−11 |
| 19 | K: 0.0 A: 0.592566E−04 B: 0.267946E−06<br>C: 0.210245E−09 D: −.0949002E−11 |

Table 9 below shows a variable distance during zooming in Example 3.

TABLE 9

| D0 | INFINITY | INFINITY | INFINITY | 141.000 | 148.620 | 149.920 |
|---|---|---|---|---|---|---|
| D1 | 4.677 | 5.598 | 6.032 | 4.677 | 5.598 | 6.032 |
| D2 | 15.689 | 6.713 | 1.000 | 17.075 | 8.196 | 2.606 |
| D3 | 12.741 | 6.852 | 2.618 | 11.355 | 5.370 | 1.012 |

Figure 6A:
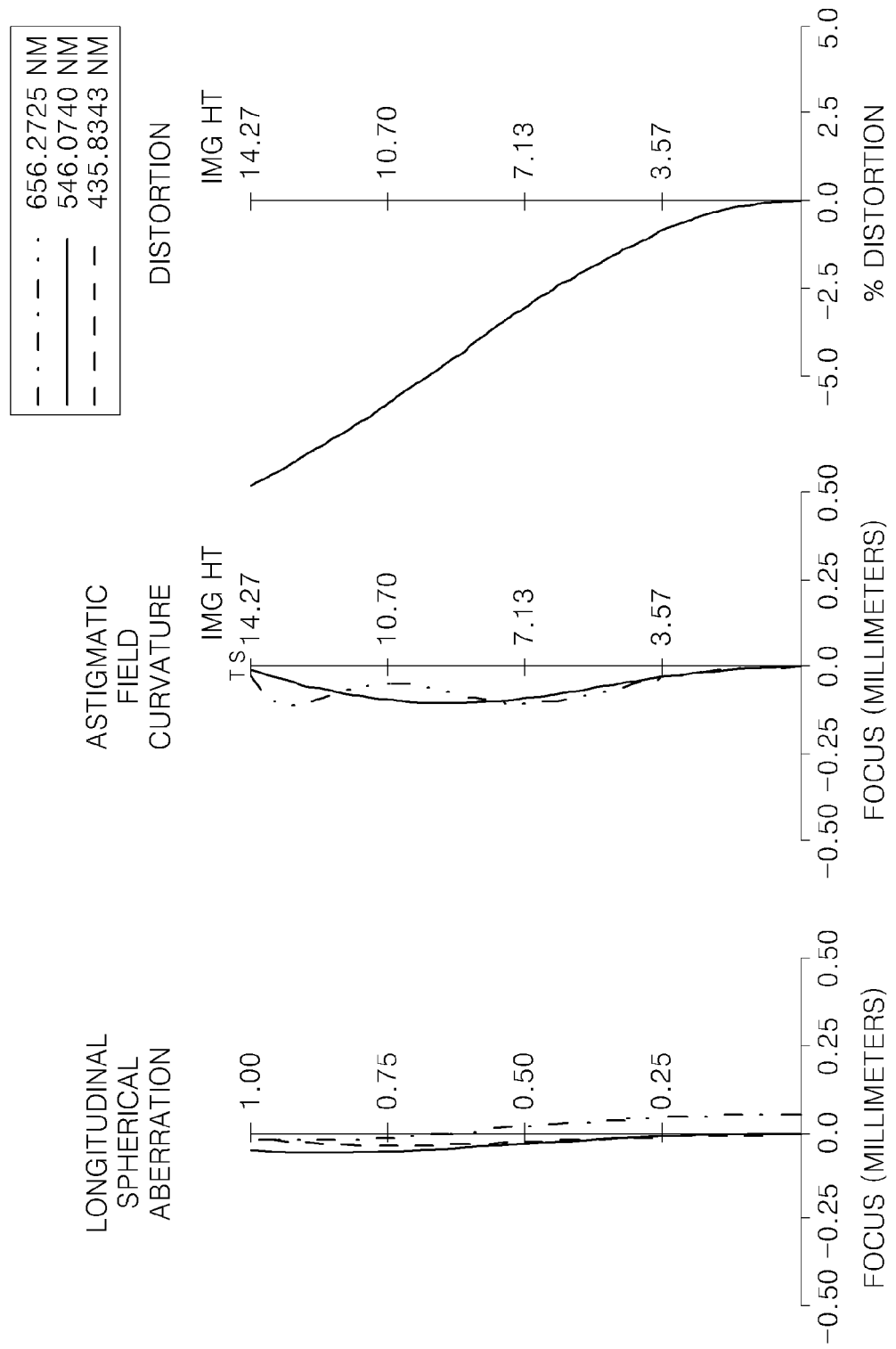
FIGS. 6A through 6C are aberration diagrams of the zoom lens of FIG. 5 at the wide angle position, the middle position, and the telephoto position.
Figure 6B:
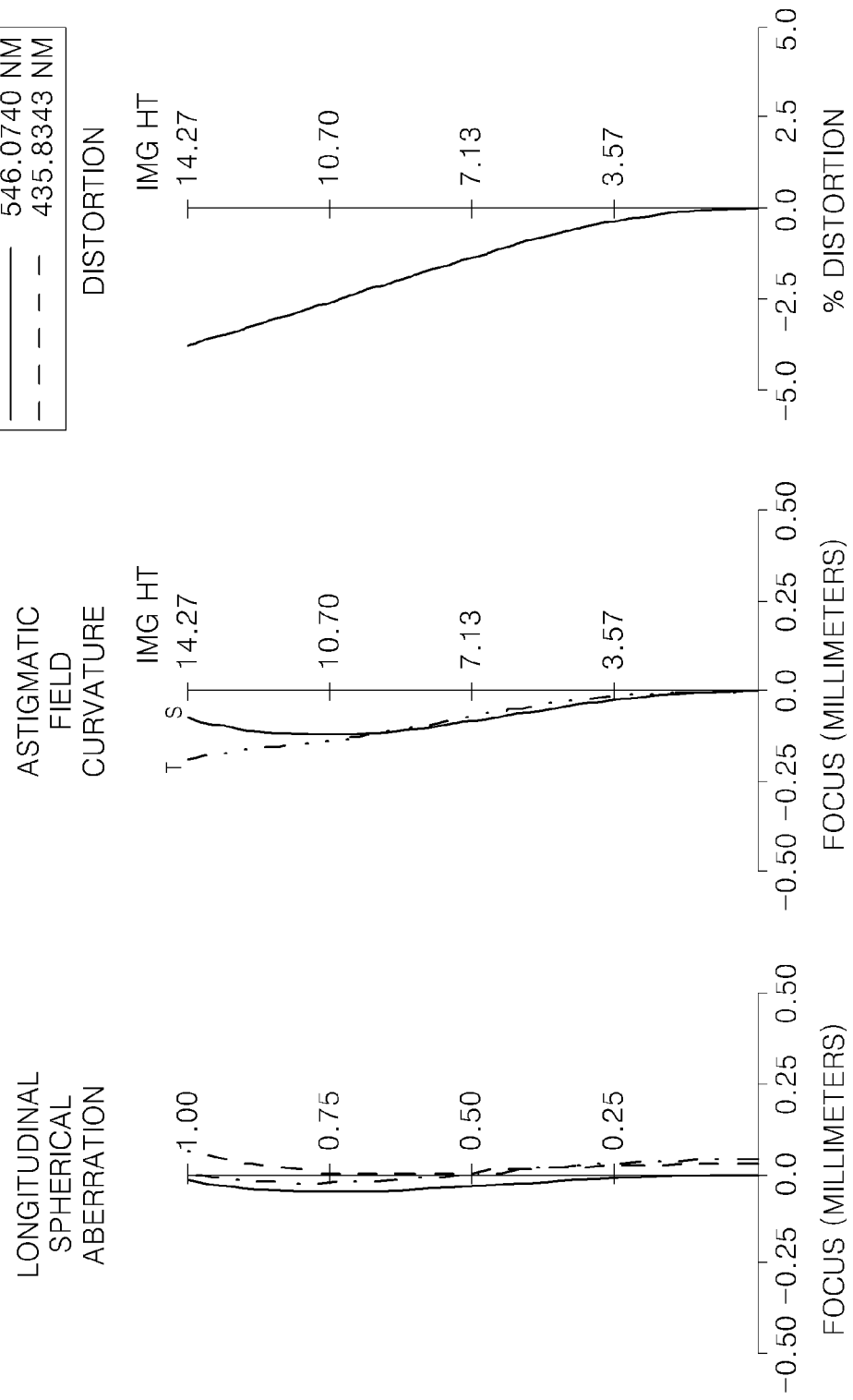
Figure 6C:
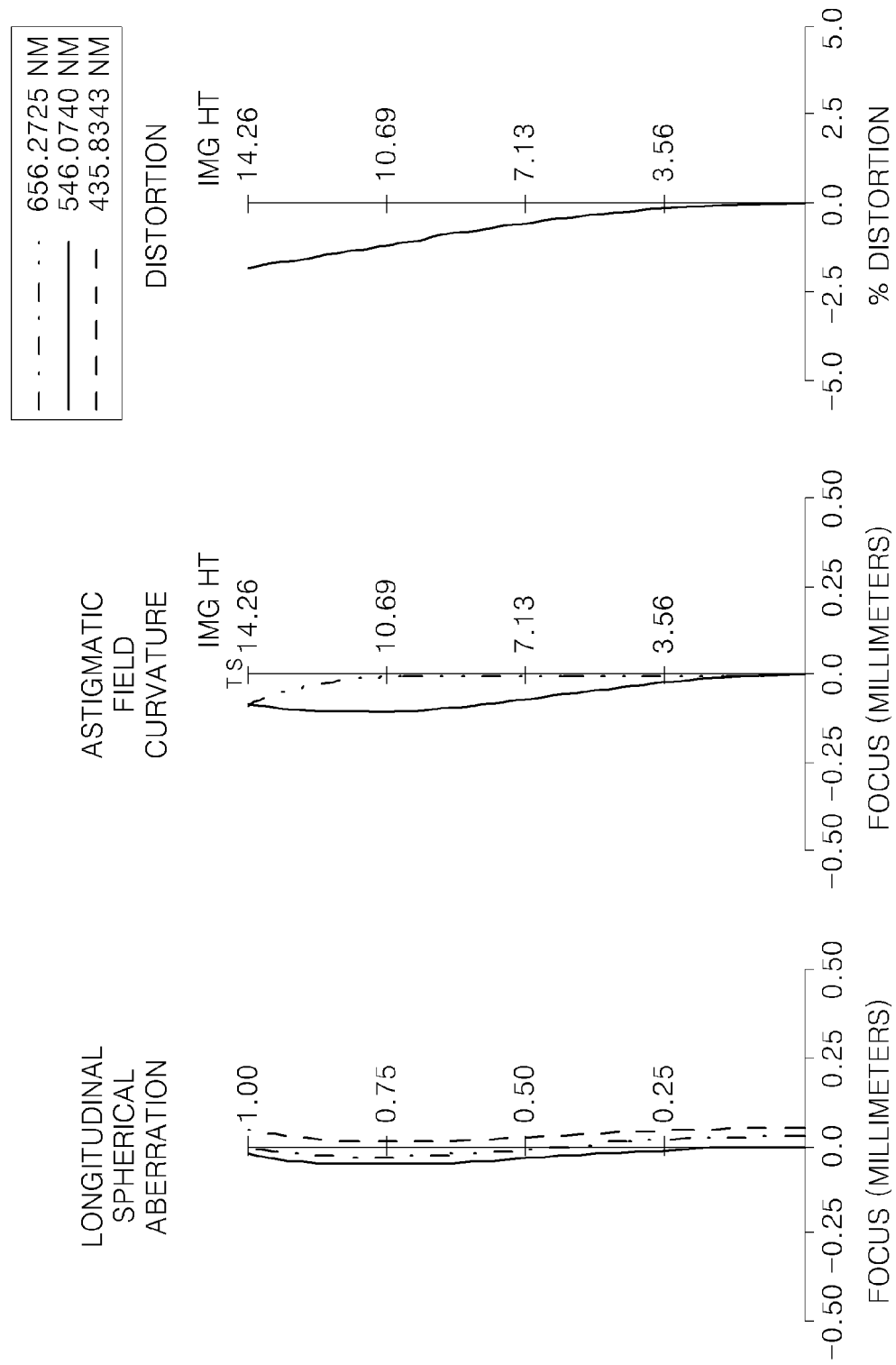

FIGS. 6A through 6C illustrate longitudinal spherical aberration, astigmatic field curvature, and distortion respectively at each of the wide angle position, middle position, and the telephoto position of the zoom lens 100 of FIG. 5.

Example 4

Figure 7:
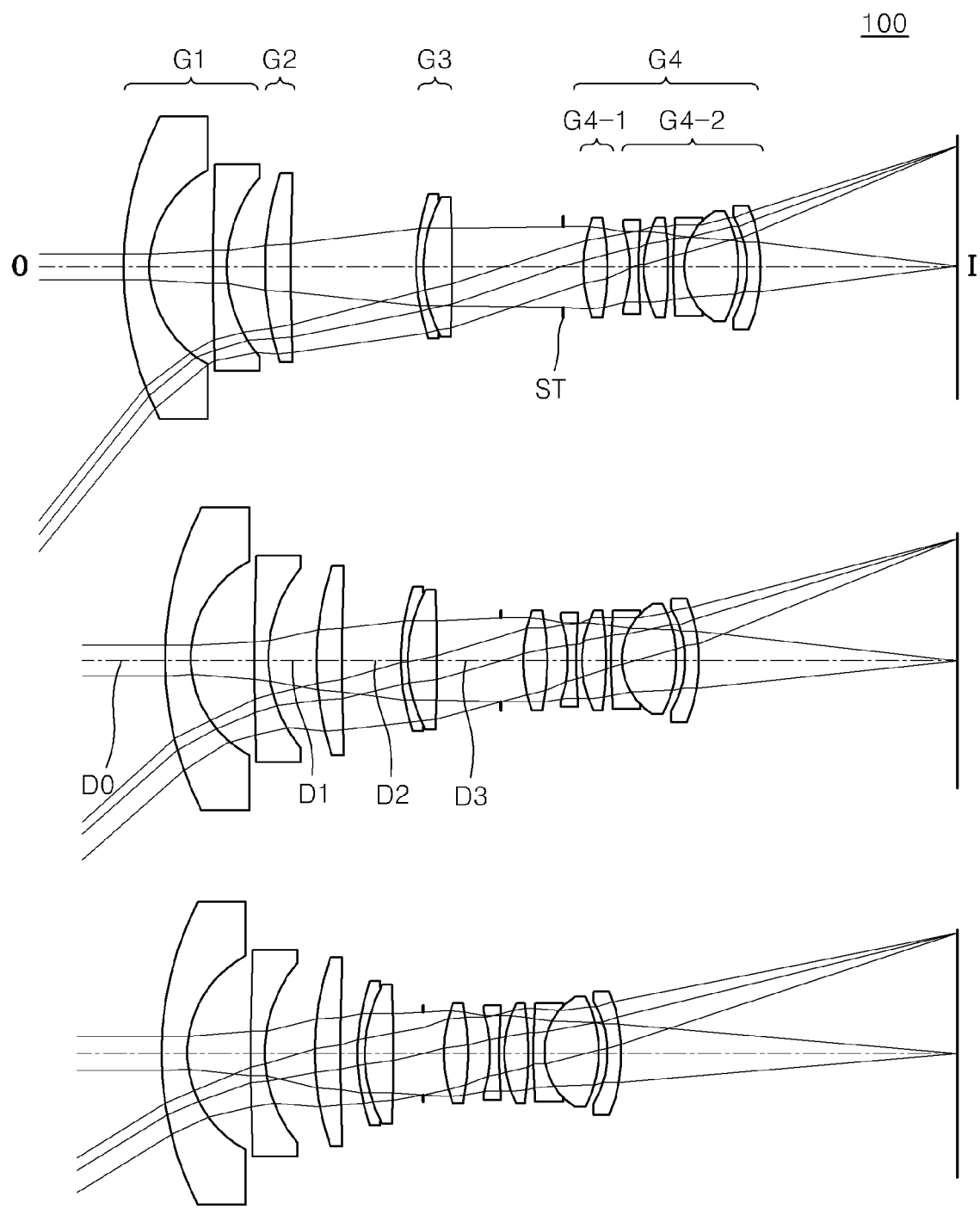
FIG. 7 is a diagram of another embodiment of a zoom lens at a wide angle position, a middle position, and a telephoto position.

FIG. 7 is a diagram of the zoom lens 100 according to Example 4, and Table 10 below shows design data.

TABLE 10 f: 12.36 to 17.00 to 23.41 fno: 4.1 to 4.73 to 5.8 2ω: 103° to 82° to 64°

| Lens Surface | R | Dn | Nd | vd |
|---|---|---|---|---|
| 1 | 39.132 | 3.000 | 1.77250 | 49.6 |
| 2 | 12.911 | 7.661 | | |
| 3* | 1130.629 | 1.700 | 1.77250 | 49.6 |
| 4* | 14.191 | D1 | | |
| 5 | 39.560 | 3.000 | 1.74666 | 23.8 |
| 6 | 224.560 | D2 | | |
| 7 | 26.068 | 0.800 | 1.84666 | 23.8 |
| 8 | 16.477 | 3.500 | 1.62588 | 35.7 |
| 9 | −233.053 | D3 | | |
| 10 | INFINITY | 2.500 | | |
| 11 | 16.661 | 3.000 | 1.49700 | 81.6 |
| 12 | −31.737 | 2.522 | | |
| 13 | −18.899 | 1.200 | 1.77250 | 49.6 |
| 14 | 68.562 | 0.500 | | |
| 15 | 11.729 | 2.800 | 1.48749 | 70.4 |
| 16 | −52.139 | 0.800 | | |
| 17 | 97.174 | 1.200 | 1.77250 | 49.6 |
| 18 | 7.695 | 6.500 | 1.48749 | 70.4 |
| 19 | −13.712 | 1.000 | | |
| 20 | −11.147 | 1.500 | 1.77250 | 49.6 |
| 21* | −18.629 | | | |

Table 11 below shows aspherical coefficients in Example 4.

TABLE 11

| Lens Surface | Aspherical Coefficient |
|---|---|
| 3 | K: 0.0 A: 0.261940E−04 B: −0.149604E−06 C: 0.515180E−09 D: −0.180429E−11 |
| 4 | K: 0.0 A: −0.493587E−04 B: −0.206555E−06 C: −0.120861E−08 D: −0.230094E−11 |
| 21 | K: 0.0 A: 0.431619E−04 B: 0.327603E−07 C: 0.671948E−08 D: −0.821777E−10 |

Table 12 shows a variable distance during zooming in Example 4.

TABLE 12

| D0 | INFINITY | INFINITY | INFINITY | 141.015 | 146.011 | 145.423 |
|---|---|---|---|---|---|---|
| D1 | 4.500 | 5.625 | 6.0585 | 4.500 | 5.625 | 6.055 |
| D2 | 14.824 | 6.786 | 2.000 | 15.906 | 7.956 | 3.270 |
| D3 | 12.972 | 7.719 | 3.254 | 11.890 | 6.549 | 1.984 |

Figure 8A:
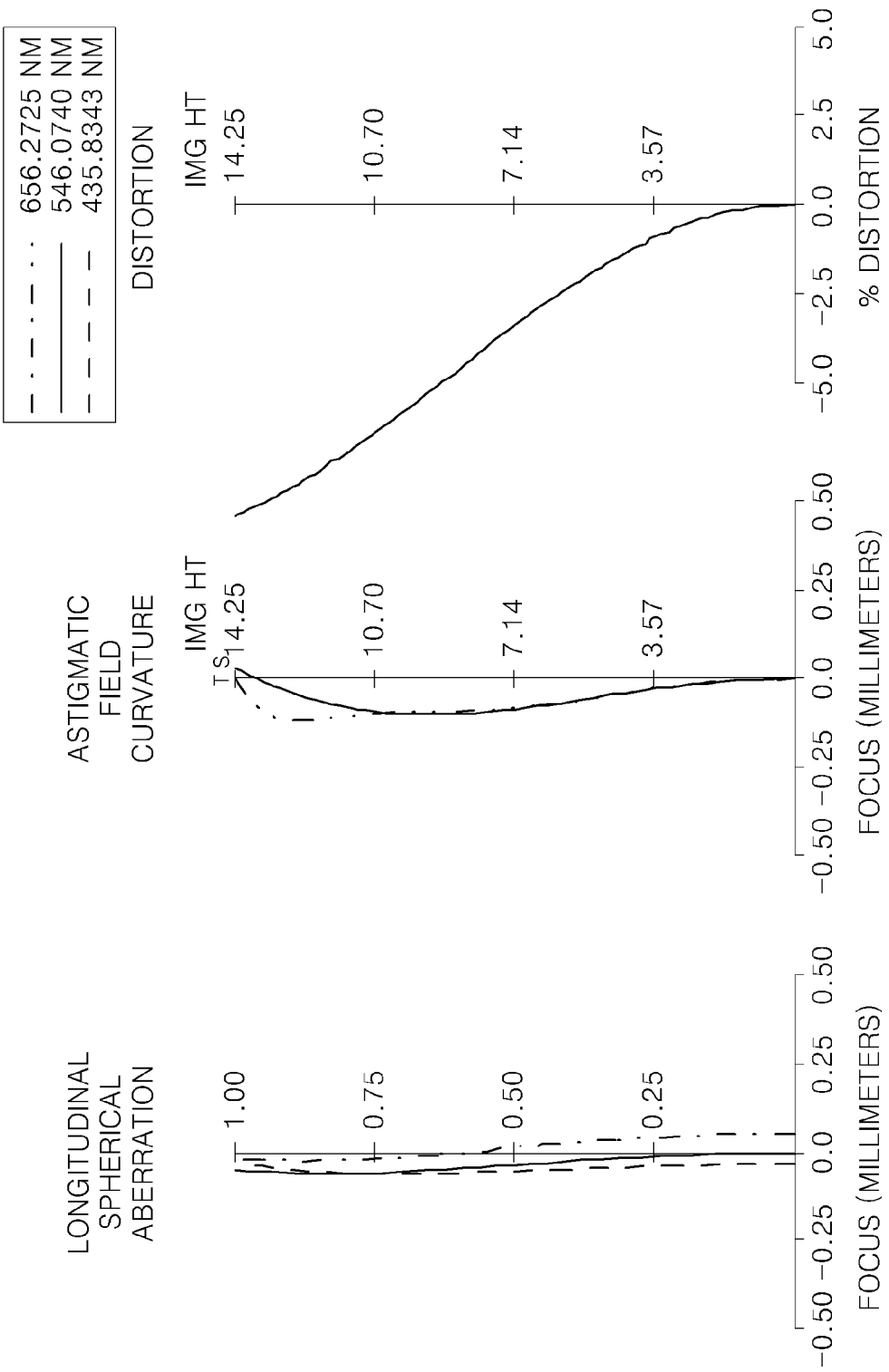
FIGS. 8A through 8C are aberration diagrams of the zoom lens of FIG. 7 at the wide angle position, the middle position, and the telephoto position.
Figure 8B:
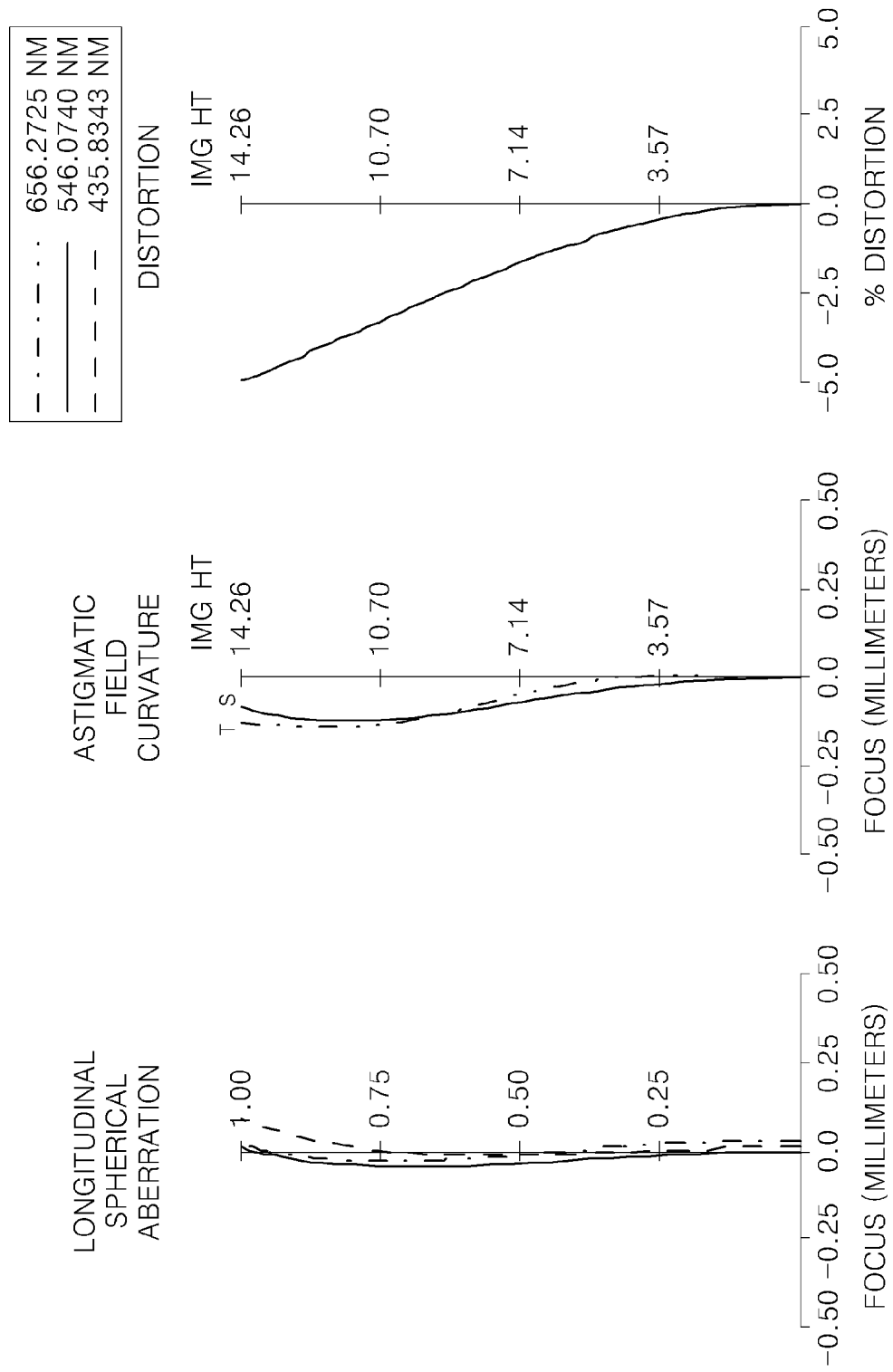
Figure 8C:
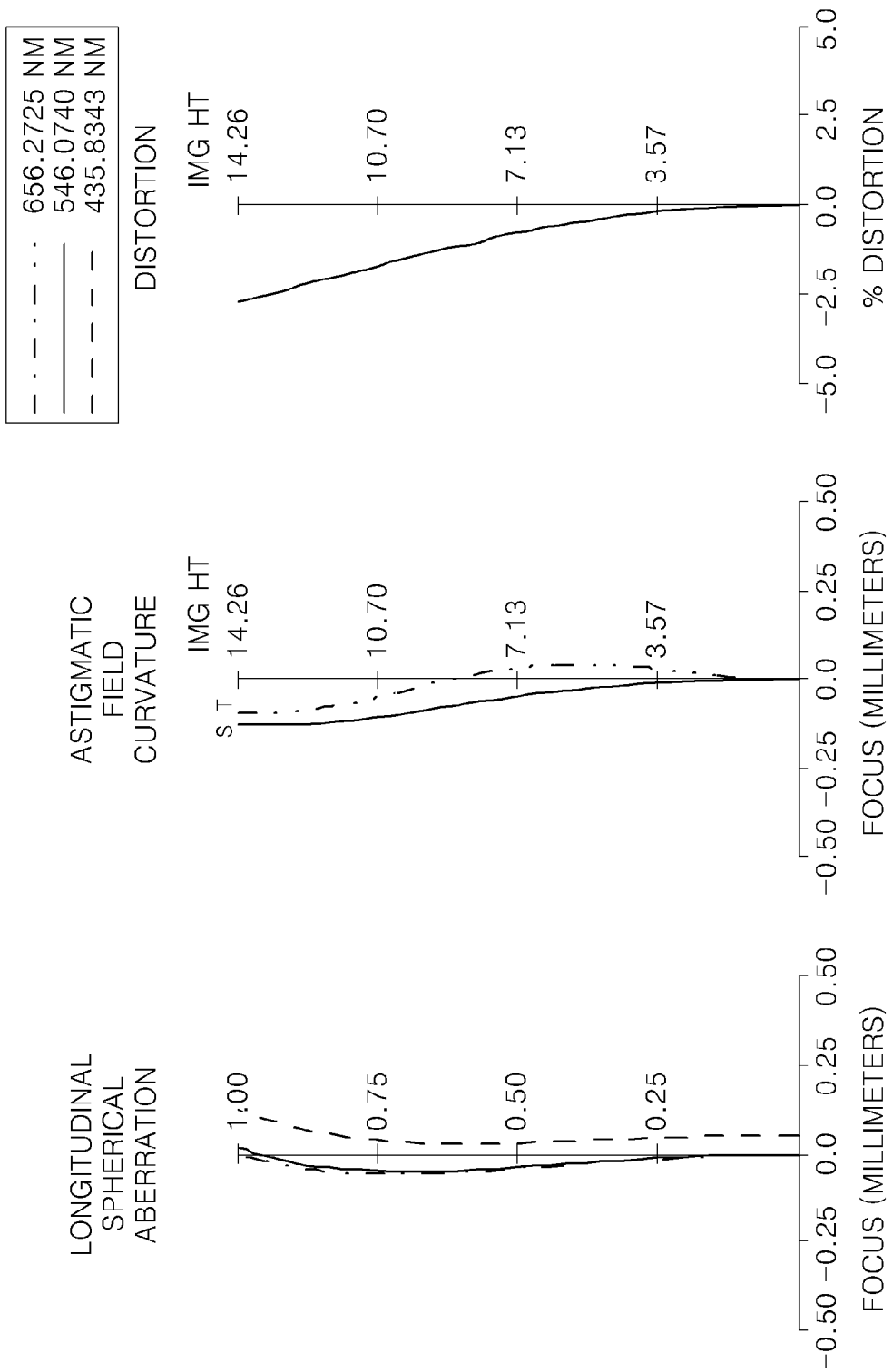

FIGS. 8A through 8C illustrate longitudinal spherical aberration, astigmatic field curvature, and distortion respectively at each of the wide angle position, middle position, and the telephoto position of the zoom lens 100 of FIG. 7.

Example 5

Figure 9:
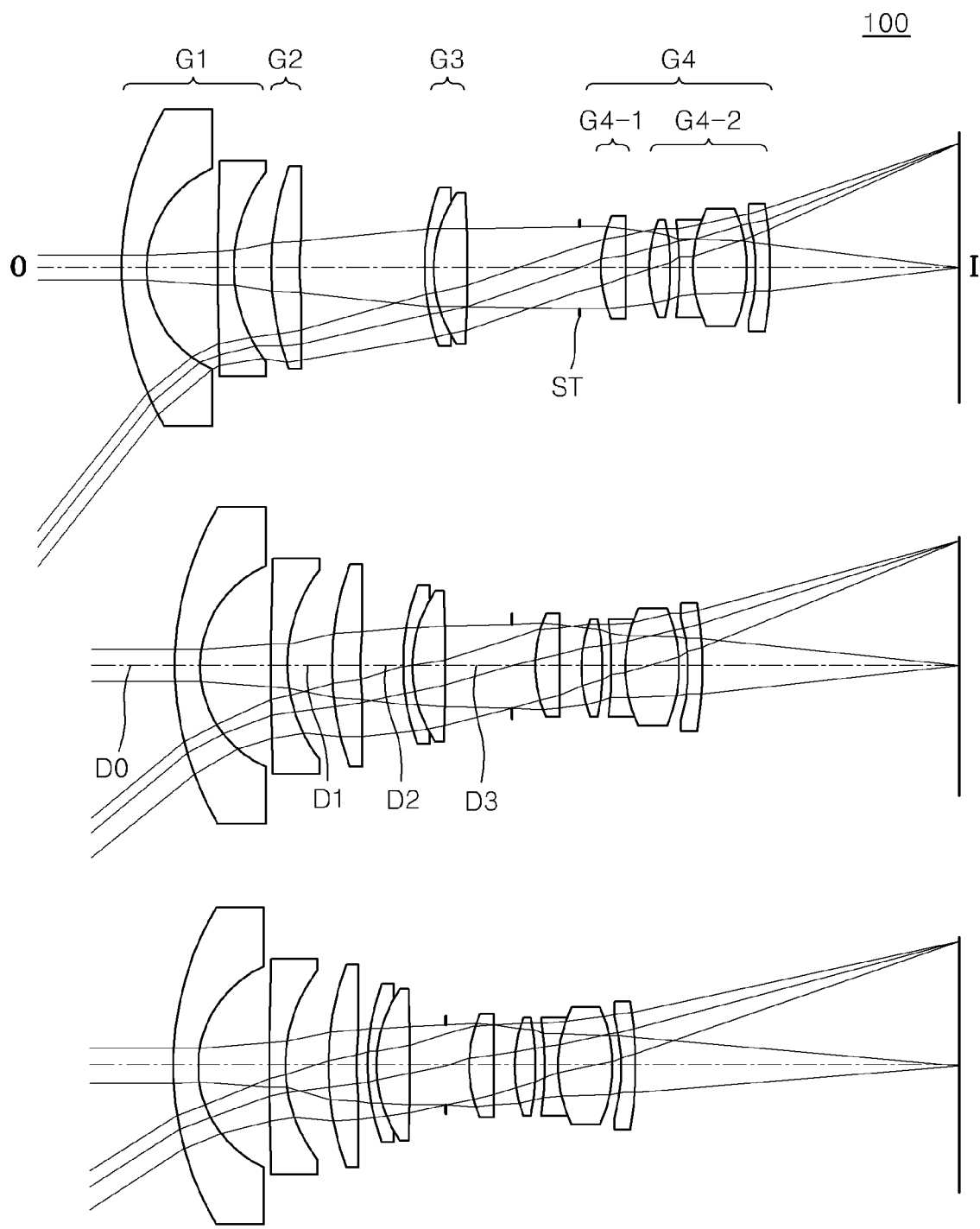
FIG. 9 is a diagram of another embodiment of a zoom lens at a wide angle position, a middle position, and a telephoto position.

FIG. 9 is a diagram of the zoom lens 100 according to Example 5, and Table 13 below shows design data.

TABLE 13 f: 12.36 to 18.00 to 23.4 fno: 4.1 to 4.73 to 5.8 2ω: 103° to 79° to 64°

| Lens Surface | R | Dn | Nd | vd |
|---|---|---|---|---|
| 1 | 35.537 | 3.000 | 1.83481 | 42.72 |
| 2 | 12.683 | 8.110 | | |
| 3* | 3231.806 | 1.700 | 1.77250 | 49.62 |
| 4* | 14.805 | D1 | | |
| 5 | 33.642 | 3.210 | 1.84666 | 23.78 |
| 6 | 374.122 | D2 | | |
| 7 | 26.177 | 1.000 | 1.84666 | 23.78 |
| 8 | 15.716 | 4.000 | 1.60342 | 38.01 |
| 9 | −230.085 | D3 | | |
| 10 | INFINITY | 2.500 | | |
| 11 | 14.289 | 3.000 | 1.49700 | 81.61 |
| 12 | 304.443 | 2.550 | | |
| 13 | 19.022 | 2.400 | 1.48749 | 70.44 |
| 14 | −33.561 | 1.200 | | |
| 15 | −20.891 | 1.200 | 1.88300 | 40.80 |
| 16 | 14.528 | 6.500 | 1.48749 | 70.44 |
| 17 | −15.186 | 1.000 | | |
| 18 | −22.568 | 1.500 | 1.77250 | 49.62 |
| 19* | −38.034 | | | |

Table 14 shows aspherical coefficients in Example 5.

TABLE 14

| Lens Surface | Aspherical Coefficient |
|---|---|
| 3 | K: 0.0 A: 0.282208E−04 B: −0.170632E−06 C: 0.783184E−09 D: −0.230535E−11 |
| 4 | K: 0.0 A: −0.354777E−04 B: −0.290803E−06 C: 0.457762E−10 D: −0.609647E−11 |
| 19 | K: 0.0 A: 0.671962E−04 B: 0.358213E−06 C: −0.376745E−10 D: 0.181612E−10 |

Table 15 shows a variable distance during zooming in Example 5.

TABLE 15

| D0 | INFINITY | INFINITY | INFINITY | 144.102 | 150.293 | 149.963 |
|---|---|---|---|---|---|---|
| D1 | 4.500 | 5.250 | 5.100 | 4.500 | 5.250 | 5.100 |
| D2 | 14.244 | 4.551 | 1.302 | 15.630 | 6.074 | 2.896 |
| D3 | 12.668 | 7.645 | 3.913 | 11.283 | 6.123 | 2.319 |

Table 16 shows that Examples 1 through 5 satisfy Equations 1 through 5 above.

TABLE 16

| | Equation 1 | Equation 2 | Equation 3 | Equation 4 | Equation 5 |
|---|---|---|---|---|---|
| Example 1 | 1.28 | 2.90 | 0.60 | 0.47 | 0.31 |
| Example 2 | 1.45 | 2.87 | 1.04 | 0.53 | 0.31 |
| Example 3 | 1.29 | 3.01 | 1.10 | 0.54 | 0.31 |
| Example 4 | 1.35 | 2.67 | 0.63 | 0.33 | 0.29 |
| Example 5 | 1.13 | 2.99 | 0.90 | 0.67 | 0.40 |

Figure 10A:
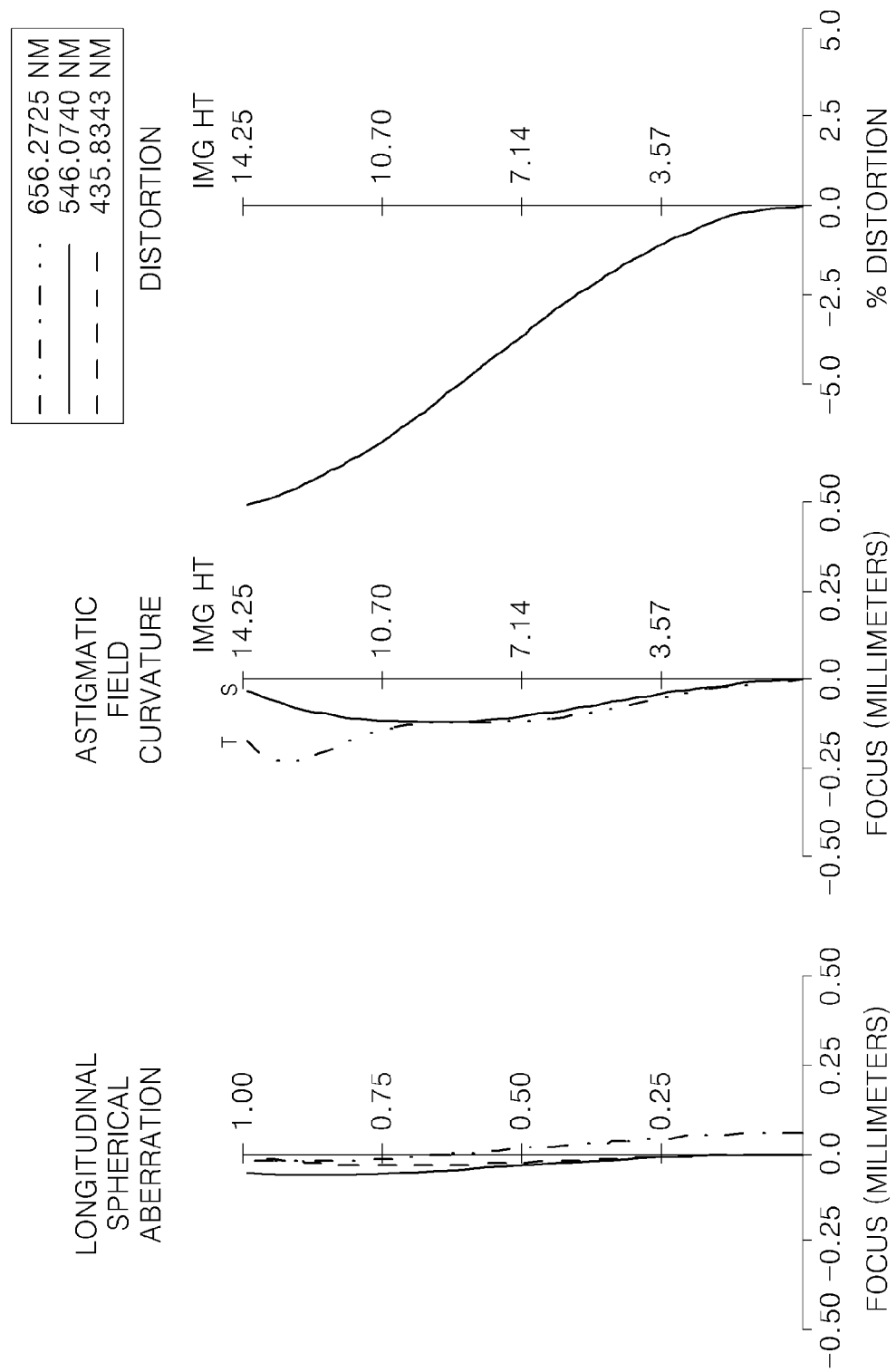
FIGS. 10A through 10C are aberration diagrams of the zoom lens of FIG. 9 at the wide angle position, the middle position, and the telephoto position.
Figure 10B:
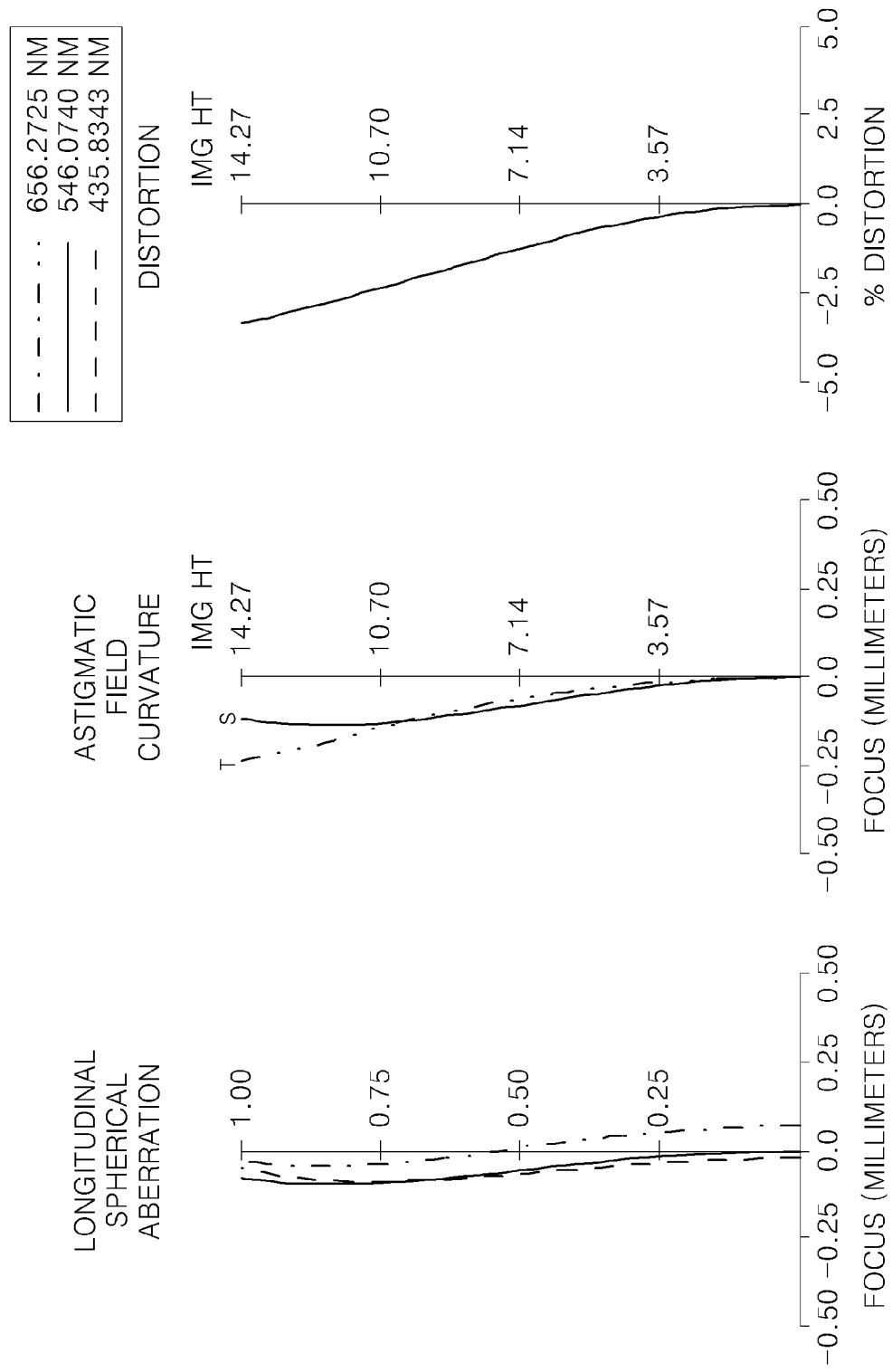
Figure 10C:
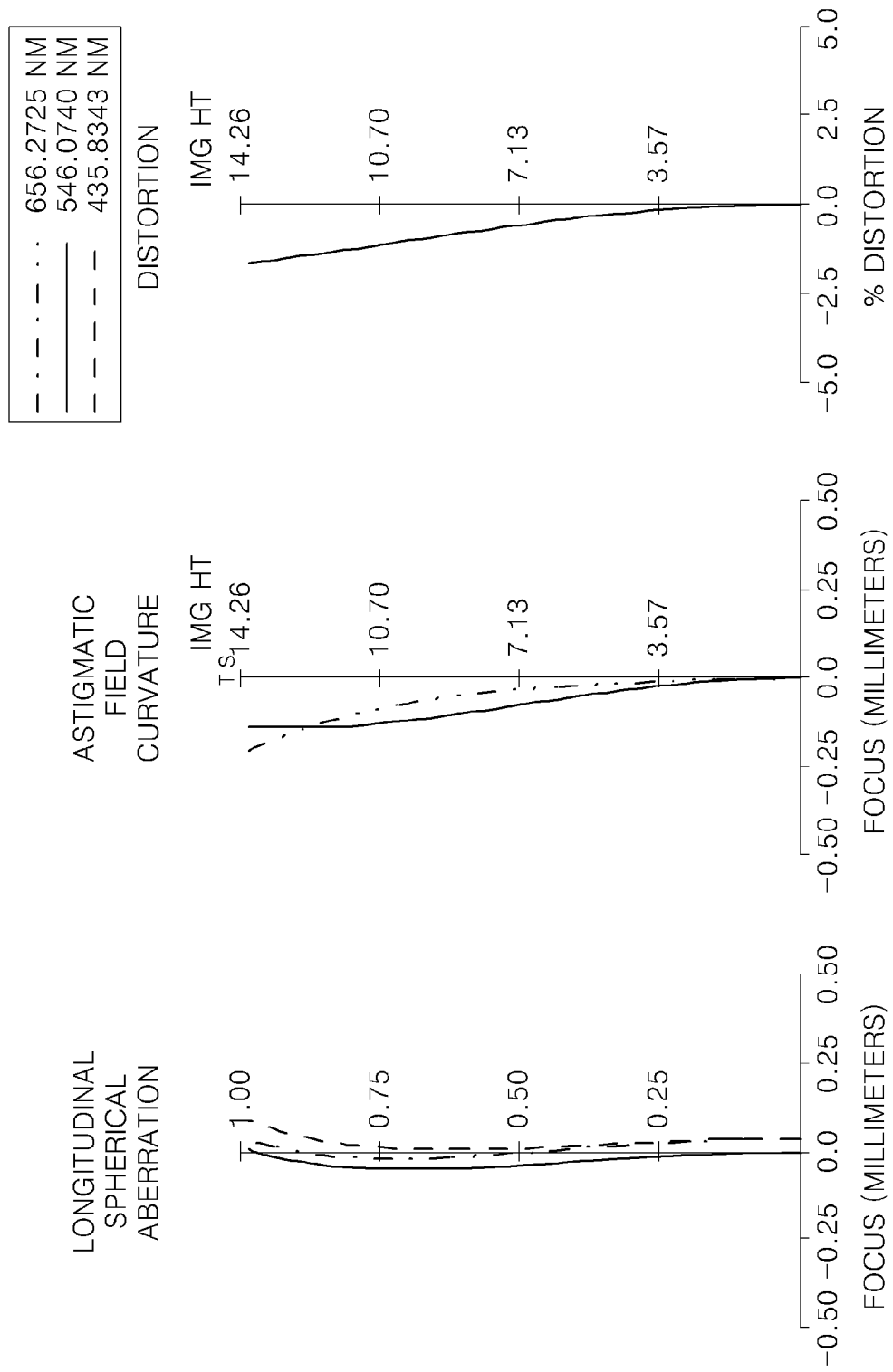

FIGS. 10A through 10C illustrate longitudinal spherical aberration, astigmatic field curvature, and distortion respectively at each of the wide angle position, middle position, and the telephoto position of the zoom lens 100 of FIG. 9.

Figure 11:
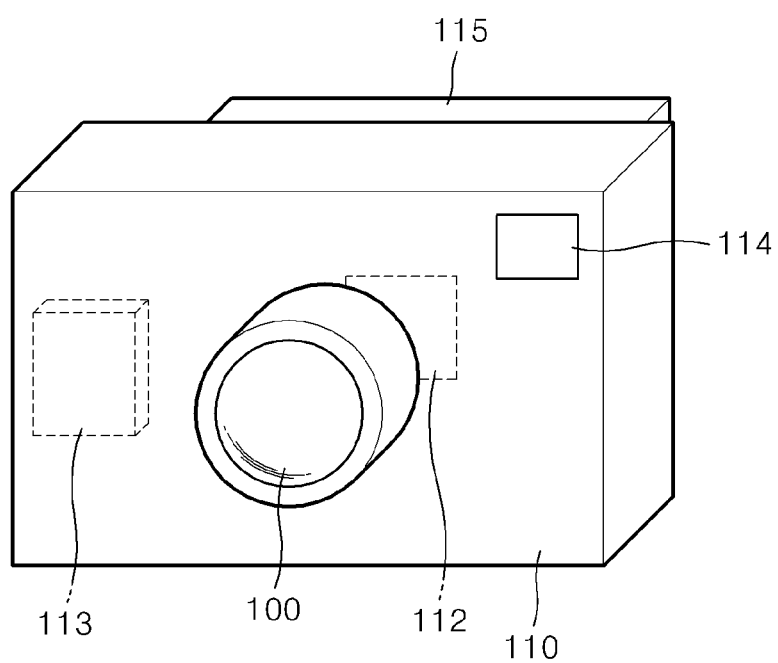
FIG. 11 is a diagram of a photographing apparatus according to an embodiment of the invention.

FIG. 11 is a diagram of a photographing apparatus including the zoom lens 100, according to an embodiment of the invention. The photographing apparatus includes the zoom lens 100 described above, and an imaging device 112 for receiving light formed into an image by the zoom lens 100. The photographing apparatus may further include a recording unit having recorded thereon information corresponding to a subject image that is photoelectrically converted by the imaging device 112, and a view finder 114 for observing the subject image. Also, the photographing apparatus may include a display unit 115 on which the subject image is displayed. Here, the view finder 114 and the display unit 115 are individually included, but alternatively, the display unit 115 may be included without the view finder 114. The photographing apparatus of FIG. 11 is only an example, and the zoom lens 100 may be applied to other optical devices as well as a camera. As such, by applying the zoom lens 100 to the photographing apparatus, which may be a digital camera, an optical device that performs quick auto focusing, has a wide angle, is bright, and is capable of capturing an image at high magnification can be realized.

While exemplary embodiments have been particularly shown and described herein, it will be understood by those of ordinary skill in the art that various changes in form and details may be made therein without departing from the spirit and scope of the invention as defined by the following claims.

What is claimed is:

1. A zoom lens comprising, in an order from an object side:
    a first lens group having negative refractive power;
    a second lens group having positive refractive power;
    a third lens group having positive refractive power; and
    a fourth lens group having an iris on a side of the fourth lens group closest to the object side and positive refractive power,
    wherein, while zooming from a wide angle position to a telephoto position, the first through fourth lens groups are moved such that the interval between the first and second lens groups increases, the interval between the second and third lens groups decreases, and the interval between the third and fourth lens groups decreases, and focusing is performed by moving the third lens group,
    wherein the third lens group comprises a positive lens and a negative lens, and
    wherein the positive lens and the negative lens are a cemented lens and satisfy the following equation:

$$2.3 < |f3/\sqrt{(fw \times ft)}| < 3.4$$

wherein f3 denotes the focal length of the third lens group, fw denotes the overall focal length of the zoom lens at the wide angle position, and ft denotes the overall focal length of the zoom lens at the telephoto position.

2. The zoom lens of claim 1, satisfying the following equation:

$$1.1 < TL/TW < 1.6$$

wherein TW denotes the interval between the first and second lens groups at the wide angle position and TL denotes the interval between the first and second lens groups at the telephoto position.

3. The zoom lens of claim 1, wherein the first lens group comprises at least two negative lenses, wherein the at least two negative lenses comprise at least one aspherical surface.

4. A zoom lens comprising, in an order from an object side:
    a first lens group having negative refractive power;
    a second lens group having positive refractive power;
    a third lens group having positive refractive power; and
    a fourth lens group having an iris on a side of the fourth lens group closest to the object side and positive refractive power,
    wherein, while zooming from a wide angle position to a telephoto position, the first through fourth lens groups are moved such that the interval between the first and second lens groups increases, the interval between the second and third lens groups decreases, and the interval between the third and fourth lens groups decreases, and focusing is performed by moving the third lens group, and
    wherein the fourth lens group comprises a first sub lens group having positive refractive power and a second sub lens group having positive refractive power.

5. The zoom lens of claim 4, wherein the first sub lens group comprises one positive lens.

6. The zoom lens of claim 4, wherein the first sub lens group comprises a cemented lens comprising a positive lens and a negative lens.

7. The zoom lens of claim 4, wherein the first sub lens group satisfies the following equation:

$$0.4 < fP/f4 < 1.3$$

wherein fP denotes the focal length of the first sub lens group of the fourth lens group and f4 denotes the focal length of the fourth lens group.

8. The zoom lens of claim 4, wherein the second sub lens group comprises a cemented lens comprising a negative lens and a positive lens, and satisfies the following equation:

$$0.2 < r/L4 < 0.7$$

wherein r denotes the radius of curvature of a cemented surface of the cemented lens of the second sub lens group, and L4 denotes the full length of the fourth lens group.

9. The zoom lens of claim 4, wherein the second sub lens group comprises a cemented lens comprising a negative lens and a positive lens, and satisfies the following equation:

$$n1 - n2 > 0.25$$

wherein n1 denotes the refractive index of the negative lens of the cemented lens of the second sub lens group and n2 denotes the refractive index of the positive lens of the cemented lens of the second sub lens group.

10. The zoom lens of claim 4, wherein the fourth lens group comprises at least one aspherical surface.

11. A photographing apparatus comprising:
    a zoom lens; and
    an imaging device for receiving an image formed by the zoom lens,
    wherein the zoom lens comprises, in an order from an object side:
    a first lens group having negative refractive power;
    a second lens group having positive refractive power;
    a third lens group having positive refractive power; and
    a fourth lens group having an iris on a side of the fourth lens group closest to the object side and positive refractive power,
    wherein, while zooming from a wide angle position to a telephoto position, the first through fourth lens groups are moved such that the interval between the first and second lens groups increases, an interval between the second and third lens groups decreases, and the interval between the third and fourth lens groups decreases, and focusing is performed by moving the third lens group,
    wherein the third lens group comprises a positive lens and a negative lens, and
    wherein the positive lens and the negative lens are a cemented lens and satisfy the following equation:

$$2.3 < |f3/\sqrt{(fw \times ft)}| < 3.4$$

wherein f3 denotes the focal length of the third lens group, fw denotes the overall focal length of the zoom lens at the wide angle position, and ft denotes the overall focal length of the zoom lens at the telephoto position.

12. The photographing apparatus of claim 11, which satisfies the following equation:

$$1 < TL/TW < 1.6$$

wherein TW denotes the interval between the first and second lens groups at the wide angle position and TL denotes the interval between the first and second lens groups at the telephoto position.

13. The photographing apparatus of claim 11, wherein the first lens group comprises at least two negative lenses, wherein the at least two negative lenses comprise at least one aspherical surface.

14. The photographing apparatus of claim 11, wherein the fourth lens group comprises a first sub lens group having positive refractive power and a second sub lens group having positive refractive power.

15. The photographing apparatus of claim 14, wherein the first sub lens group comprises one positive lens.

16. The photographing apparatus of claim 14, wherein the first sub lens group comprises a cemented lens comprising a positive lens and a negative lens.

* * * * *